United States Patent
Green et al.

(10) Patent No.: US 7,303,040 B2
(45) Date of Patent: Dec. 4, 2007

(54) ACTIVE VEHICLE HOOD SYSTEM AND METHOD

(75) Inventors: David J. Green, Brigham City, UT (US); Guy R. Letendre, Ogden, UT (US); Brent A. Parks, Englewood, CO (US); Michael Schramm, Perry, UT (US); Roman Zlotnikov, Salt Lake City, UT (US); Bradley W. Smith, Ogden, UT (US); Michael P. Jordan, South Weber, UT (US); Michael J. Ravenberg, Corrine, UT (US)

(73) Assignee: Autolive ASP, Inc., Ogden, UT (US)

( * ) Notice: Subject to any disclaimer, the term of this patent is extended or adjusted under 35 U.S.C. 154(b) by 402 days.

(21) Appl. No.: 10/847,766

(22) Filed: May 18, 2004

(65) Prior Publication Data

US 2005/0257980 A1  Nov. 24, 2005

(51) Int. Cl.
*B60R 21/34* (2006.01)

(52) U.S. Cl. .................. 180/274; 180/69.21
(58) Field of Classification Search .......... 180/274, 180/69.21; 296/187.04; B60R 21/34
See application file for complete search history.

(56) References Cited

U.S. PATENT DOCUMENTS

| | | |
|---|---|---|
| 731,354 A | 6/1903 | Hochhalter et al. |
| 1,986,273 A | 1/1935 | Fulton |
| 3,106,131 A | 10/1963 | Barr et al. |
| 3,199,288 A | 8/1965 | Nahas |
| 3,392,599 A | 7/1968 | White |
| 3,565,398 A | 2/1971 | Floria et al. |
| 3,715,130 A | 2/1973 | Harada et al. |
| 3,967,707 A | 7/1976 | Carlton |
| 4,015,870 A | 4/1977 | Stcherbatcheff et al. |
| 4,091,621 A | 5/1978 | Patrichi |
| 4,125,170 A | 11/1978 | Botz |
| 4,249,632 A | 2/1981 | Lucchini et al. |
| 4,560,145 A | 12/1985 | Widmer |

(Continued)

FOREIGN PATENT DOCUMENTS

DE  28 14 107  10/1979

(Continued)

*Primary Examiner*—Ruth Ilan
(74) *Attorney, Agent, or Firm*—Sally J Brown; Madson & Austin

(57) ABSTRACT

A novel active hood system is disclosed. The active hood system is designed such that in the event of a pedestrian/vehicle accident, the active hood system will soften the impact between the pedestrian and the vehicle by moving the vehicle hood into an elevated position. In some embodiments, the active hood system is constructed such that during a pedestrian/vehicle collision, the active hood system will raise the vehicle hood into an elevated position by having the hood move through a first travel distance and a second travel distance. The active hood system includes an actuator and a hinge. The actuator may be attached to the hinge. The actuator is designed such that if it is deployed, the actuator will raise the hood into the elevated position. Additional embodiments may also be made in which the actuator is vented during deployment. A dampener is also added to the active hood system. The dampener is designed to dampen the movement of the hood as the hood is moved through the second travel distance.

32 Claims, 14 Drawing Sheets

U.S. PATENT DOCUMENTS

| | | |
|---|---|---|
| 4,582,351 A | 4/1986 | Edwards |
| 4,669,354 A | 6/1987 | Lucy |
| 4,687,189 A | 8/1987 | Stoll et al. |
| 5,052,732 A | 10/1991 | Oplet et al. |
| 5,115,878 A | 5/1992 | Hayata |
| 5,303,631 A | 4/1994 | Frehaut et al. |
| 5,431,087 A | 7/1995 | Kambara |
| 5,639,117 A | 6/1997 | Mandzy et al. |
| 5,695,242 A | 12/1997 | Brantman et al. |
| 6,039,347 A | 3/2000 | Maynard |
| 6,079,745 A | 6/2000 | Wier |
| 6,182,782 B1 | 2/2001 | Matsuura et al. |
| 6,217,108 B1 | 4/2001 | Sasaki |
| 6,237,992 B1 | 5/2001 | Howard |
| 6,257,657 B1 | 7/2001 | Sasaki |
| 6,293,362 B1 | 9/2001 | Sasaki et al. |
| 6,323,494 B1 | 11/2001 | Lee |
| 6,330,734 B1 | 12/2001 | Cho |
| 6,345,679 B1 | 2/2002 | Sasaki |
| 6,364,402 B1 | 4/2002 | Sasaki et al. |
| 6,415,882 B1 | 7/2002 | Schuster et al. |
| 6,439,330 B1 | 8/2002 | Paye |
| 6,471,386 B2 | 10/2002 | Oh |
| 6,474,489 B2 | 11/2002 | Payne et al. |
| 6,499,555 B2 | 12/2002 | Ishizaki et al. |
| 6,510,914 B2 | 1/2003 | Ishizaki et al. |
| 6,513,617 B2 | 2/2003 | Sasaki et al. |
| 6,516,278 B1 | 2/2003 | Ishizaki et al. |
| 6,530,449 B2 | 3/2003 | Sasaki et al. |
| 6,540,275 B1 | 4/2003 | Iwamoto et al. |
| 6,554,341 B2 | 4/2003 | Lee |
| 6,571,901 B2 | 6/2003 | Lee |
| 6,588,526 B1 | 7/2003 | Polz et al. |
| 2002/0033755 A1 | 3/2002 | Ishizaki et al. |
| 2003/0121710 A1* | 7/2003 | Hamada et al. ............ 180/274 |
| 2004/0006979 A1 | 1/2004 | Parks |
| 2004/0089988 A1* | 5/2004 | Scott et al. ............ 267/140.11 |

FOREIGN PATENT DOCUMENTS

| | | |
|---|---|---|
| DE | 28 41 315 | 4/1980 |
| DE | 197 12 961 | 10/1998 |
| DE | 100 33 200 | 2/2001 |
| DE | 199 45 844 | 3/2001 |
| DE | 199 57 872 | 6/2001 |
| DE | 101 02 760 | 7/2002 |
| DE | 101 17 396 | 10/2002 |
| DE | 101 28 967 | 12/2002 |
| DE | 101 38 449 A1 * | 2/2003 |
| EP | 0 648 941 | 4/1995 |
| EP | 0 927 669 | 7/1999 |
| EP | 0 940 584 | 9/1999 |
| EP | 0 967 128 | 12/1999 |
| EP | 1 138 559 | 10/2001 |
| EP | 1 178 913 | 2/2002 |
| EP | 1 178 916 | 2/2002 |
| GB | 2 076 894 | 12/1981 |
| GB | 2 368 562 | 5/2002 |
| GB | 2 373 219 A * | 9/2002 |
| GB | 2 387 581 A | 10/2003 |
| JP | 07 125604 | 5/1995 |
| JP | 10 152018 | 6/1998 |
| JP | 10 258774 | 9/1998 |
| JP | 2001-138857 * | 5/2001 |
| JP | 2002-37018 A * | 2/2002 |
| WO | WO - 95/07415 | 3/1995 |
| WO | WO - 98/33683 | 8/1998 |
| WO | WO - 00/50270 | 8/2000 |
| WO | WO - 01/23225 | 4/2001 |
| WO | WO-01/23226 | 4/2001 |
| WO | WO - 02/055337 | 7/2002 |
| WO | WO - 02/072392 A1 | 9/2002 |
| WO | WO - 03/086826 | 10/2003 |
| WO | WO 03/086826 A1 * | 10/2003 |

* cited by examiner

ACTIVE VEHICLE HOOD SYSTEM AND METHOD

BACKGROUND OF THE INVENTION

1. Field of the Invention

The present invention relates to a novel active hood system. More specifically, the present invention relates to a novel active hood system that softens the impact between the pedestrian and the vehicle hood during a pedestrian/vehicle collision.

2. Description of Related Art

Accidents in which a motor vehicle strikes a pedestrian present a serious health risk to pedestrians. In pedestrian/vehicle accidents, the heavier and larger motor vehicle impacts the smaller and lighter pedestrian with a significant amount of force. Depending on the speed and nature of the pedestrian/vehicle accident, this forcible impact between the pedestrian and the vehicle can seriously injure the pedestrian.

One type of pedestrian/vehicle accident that is particularly harmful occurs when the vehicle's front bumper or other frontal portion impacts the pedestrian's knee, leg, and/or abdominal region. Of course, this frontal impact harms the pedestrian's knee, leg, and/or abdominal region. Usually however, this frontal impact also elevates and/or flips the pedestrian such that the pedestrian's head strikes the vehicle's hood or windshield.

This second impact—the blow to the pedestrian's head—is particularly dangerous and can cause the pedestrian severe injury or trauma.

Unfortunately, the design of many currently motor vehicles can operate to heighten the severity of the impact between the pedestrian's head against the vehicle hood. For example, in vehicles such as low profile vehicles, the portion of the vehicle hood that is adjacent to the vehicle windshield is often made to be a very hard and rigid surface. Thus, if the pedestrian's head impacts this hard surface during an accident, the likelihood that the pedestrian will be injured is substantially increased.

Moreover, in order to improve the aerodynamics and visual aesthetics of the model, many vehicles are designed such that there is little or no gap between the vehicle hood and the engine that is covered by the hood. This is especially true in low profile or compact vehicle models. While this vehicle design may improve appearance, the fact that there is little or no gap between the hood and the engine means that there is little room for the hood to deform and dissipate some of the energy of the impact of the pedestrian torso and/or head. Rather, this vehicle design can actually intensify and/or focus the energy of the impact onto the pedestrian such that the likelihood of pedestrian injury is significantly increased.

Concerned about these and other safety hazards, many groups have lobbied to have additional regulations be placed upon vehicle manufacturers. Such regulations would require that all new vehicles include a safety system that is designed to protect and/or cushion the impact of a pedestrian during a pedestrian/vehicle collision. As a result of these lobbying efforts, there is now pending legislation in Korea, Japan, and Europe that would require that all new vehicles have some sort of pedestrian protection capability. The current schedule will have this legislation take effect some time between 2005 and 2010.

In order to prepare for this pending legislation, vehicle manufacturers have begun to research various safety systems and methods for protecting pedestrians during a pedestrian/vehicle collision. One type of safety system that has been particularly studied is the so-called "active hood system" which is designed such that in the event of a pedestrian/vehicle accident, the active hood system will raise all or a portion of the hood into an elevated position. By elevating the hood, the active hood system allows the hood to undergo greater deformation during the collision. In turn, this increased hood deformation allows the hood to dissipate a larger portion of the collision energy and reduces the overall severity of the impact between the pedestrian and the vehicle.

Further development indicates that in order to effectively position the hood during a collision, the active hood system must be configured to raise the hood into the elevated position within about 15 to 30 milliseconds. While such rapid movement of the hood may be achieved, such rapid movement of the hood may cause the hood to undesirably bounce or vibrate when the hood reaches the elevated position. Such bouncing of the hood is especially prone to occur in those active hood systems that do not include a dampener or other mechanism for slowing the movement of the hood.

Accordingly, there is a need in the art for a novel active hood system that addresses and/or solves one or more of the above-listed problems. Such a system and method is disclosed herein.

BRIEF SUMMARY OF THE INVENTION

The apparatus of the present invention has been developed in response to the present state of the art, and in particular, in response to the problems and needs in the art that have not yet been fully solved by currently available active hood systems. Thus, the present invention comprises an active hood system that may be positioned on a vehicle and attached to a vehicle hood. The active hood system is designed such that during a pedestrian/vehicle collision, the active hood system will soften the impact between the pedestrian and the vehicle by raising the vehicle hood into a second, elevated position. More specifically, the active hood system is constructed such that during a pedestrian/vehicle collision, the active hood system will raise the vehicle hood into an elevated position by having the hood move through a first travel distance and a second travel distance.

The active hood system includes an actuator and a hinge. The hinge may be made of metal or other similar materials. The actuator is attachable to a portion of the vehicle and may also be attached to the hinge. In some embodiments, the actuator is constructed such that it may fit within an opening on the hinge.

The actuator may be a pyrotechnic linear actuator of the type known in the art. In some embodiments, the actuator includes one or more stages. Additional embodiments may also be made in which the actuator includes one or more vent holes that are added to the stages. The actuator is constructed to have a pre-expanded configuration and an expanded configuration. Deployment of the actuator causes the actuator to expand from the pre-expanded configuration into the expanded configuration. The active hood system is designed such that when the actuator is deployed into the expanded configuration, the actuator will move the vehicle hood into an elevated position. In some embodiments, the active hood system will move the vehicle hood into an elevated position in about 30 milliseconds.

The hinge may additionally include a rotation pin. The rotation pin is configured such that a user may open the vehicle hood. More specifically, the pin is designed such that if the hinge is attached to the hood, the pin allows a user to raise a front portion of the hood so that the user may access the vehicle's engine and engine compartment that are stored beneath the vehicle hood.

The hinge may additionally include one or more linkages. The linkages are bars or other similar features that are attached to the vehicle hood and the pin. Like the actuator, the linkages have a contracted position and an extended position. The active hood system is constructed such that the deployment of the actuator causes the linkages to expand into the extended position.

The hinge may additionally comprise a holding member. The holding member is designed to hold the linkages in a contracted position. In some embodiments, the holding member is a metal plate that is attached to the hinge. However, other embodiments may also be constructed in which the holding member comprises a spring, a clip, or another similar feature that is capable of holding the linkages in a contracted position.

A locking member may also be added to the hinge. The locking member is designed to ensure that the holding member holds the linkages in a contracted position. In some embodiments, the locking member comprises a shear pin. Of course, other embodiments may also be made in which the locking member comprises a fastener or another similar feature that is capable of contacting and/or engaging the holding member.

The active hood system also includes a dampener that is constructed to dampen the movement of the vehicle hood into the elevated position. Various different types of devices or systems may be used as the dampener. In some embodiments, the active hood system is constructed such that the dampener does not dampen the movement of the vehicle hood through the first travel distance. Rather, the active hood system is designed such that the dampener operates to dampen the movement of the vehicle hood only when the hood is moved through the second travel distance.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 20, is not intended to limit the scope of the invention, as claimed, but is merely representative of presently preferred embodiments of the invention.

Figure 1:
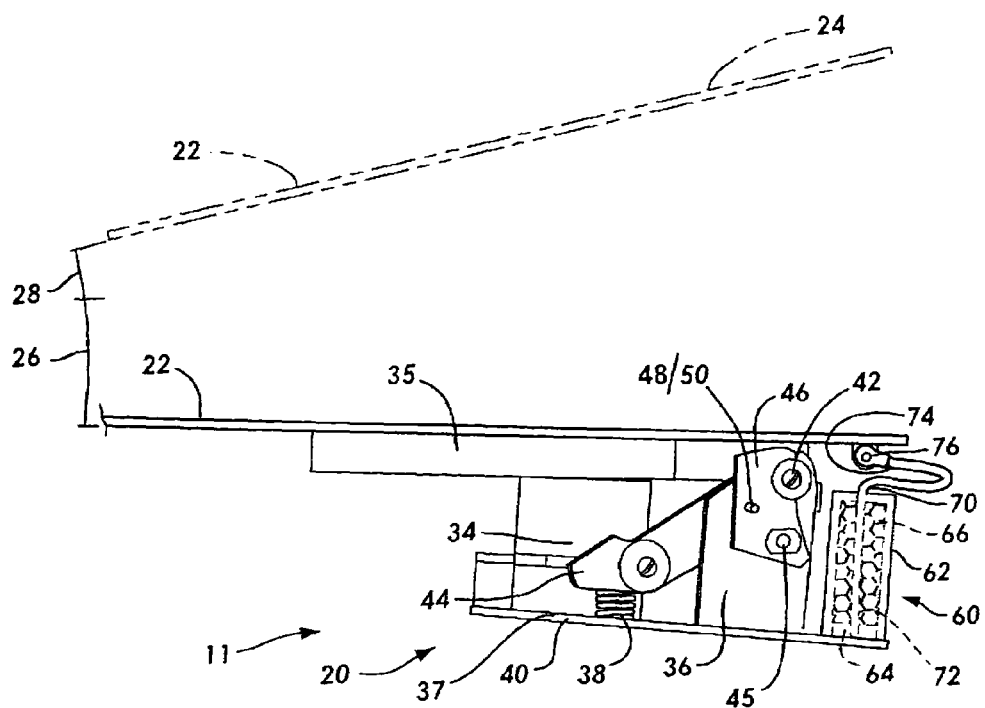
FIG. 1 is a side elevation view that illustrates one embodiment of an active hood system according to the present invention.

Referring now to FIG. 1, a perspective view of an active hood system 20 according to the present invention is provided. The active hood system 20 may be attached to a portion of a vehicle 11 and then positioned under a vehicle hood 22. The hood 22 is a part of the portion of the vehicle 11. The active hood system 20 is designed such that during a pedestrian/vehicle collision, the active hood system 20 will soften the impact between the pedestrian (not shown in FIG. 1) and the vehicle 11 by raising the vehicle hood 22 into a second, elevated position 24 (shown in phantom lines). More specifically, the active hood system 20 is constructed such that during a pedestrian/vehicle collision, the active hood system 20 will raise the vehicle hood 22 into an elevated position 24 by having the hood 22 move through a first travel distance 26 and a second travel distance 28.

Like other active hood systems, the active hood system 20 is constructed such that during a collision, the active hood system 20 will rapidly raise the hood 22 into the elevated position. In particular, the active hood system 20 may be constructed such that during a collision, the hood 22 will be moved into the elevated position within about 15 to 30 milliseconds.

The active hood system 20 includes an actuator 34 and a hinge 36. The hinge 36 is connected to or positioned proximate the actuator 34 and is designed to extend when the hood 22 is moved into the elevated position 24. The actuator 34 is attachable to the vehicle 11. Specifically, in the embodiment shown in FIG. 1, the hinge 36 is made of metal or other similar materials and comprises an actuator supporting member 37 that is attached to the actuator 34. As shown in FIG. 1, the actuator 34 extends through a portion of the supporting member 37. The supporting member 37 is made of metal or the like and is especially constructed to support and receive the actuator 34. However, other embodiments may also be made in which the actuator 34 is attached to a different portion of the hinge 36. Yet further embodiments may also be constructed in which the actuator 34 is not attached to the hinge 36.

The hinge 36 may further be constructed such that the bottom of the supporting member 37 is attached to and/or positioned adjacent to a spring 38. In turn, this spring 38 is attached to a base 40. The base 40 is a metal sheet or plate that is designed to support and/or hold the active hood system 20. In some embodiments, the base 40 is a portion of the vehicle 11. Other embodiments may also be made in which the base 40 is a separate element that is mounted to the vehicle 11 via welding, fasteners, or other methods. In yet further embodiments, the actuator 34 and/or the actuator supporting member 37 may be directly mounted to the vehicle 11.

The actuator 34 may be a pyrotechnic linear actuator of the type known in the art. One example of a pyrotechnic linear actuator that may be used as the actuator 34 is disclosed in U.S. Patent Application Publication No. 2004/0006979, which is owned by the assignee of the present application and is incorporated herein by reference. However, embodiments may also be made in which other types of devices and/or actuators are used as the actuator 34.

The actuator 34 has a pre-expanded configuration and an expanded configuration. As shown in FIG. 1, the actuator 34 is in the pre-expanded configuration. Deployment of the actuator 34 causes the actuator 34 to expand from the pre-expanded configuration into the expanded configuration. Specifically, the active hood system 20 is designed such that when the actuator 34 is deployed into the expanded configuration, the actuator 34 will move the vehicle hood 22 into an elevated position 24.

Referring still to FIG. 1, the hinge 36 may additionally include a rotation pin 42. The rotation pin 42 is configured such that a user (not shown) may open the vehicle hood 22. More specifically, the pin 42 is designed such that if the hinge 36 is attached to the hood 22, the pin 42 allows a user to raise a front portion of the hood 22 so that the user may access the vehicle's engine and engine compartment that are stored beneath the vehicle hood 22.

The hinge 36 may additionally include one or more linkages 44. The linkages 44 are bars or other similar features that are attached to the vehicle hood 22 and the pin 42. Specifically, the linkages 44 are attached to an extension 35, which in turn, is attached to the vehicle hood 22. Like the actuator 34, the linkages 44 have a contracted position and an extended position. As illustrated in FIG. 1, the linkages 44 are in the contracted position. The active hood system 20 is constructed such that the deployment of the actuator 34 causes the linkages 44 to expand into the extended position (shown in FIG. 4).

The hinge 36 may additionally comprise a holding member 46. The holding member 46 is designed to hold the linkages 44 in a contracted position. As illustrated in FIG. 1, the holding member 46 is a metal plate that is attached to the hinge 36 via a locking rotation pin 45. Of course, other embodiments may also be made in which the holding member 46 comprises a spring, a clip, or another similar feature that is capable of holding the linkages in a contracted position.

A locking member 48 may also be added to ensure that the holding member 46 holds the linkages 44 in a contracted position. In the embodiment shown in FIG. 1, the locking member 48 comprises a shear pin 50. However, other embodiments may also be made in which the locking member 48 comprises a fastener or another similar feature that is capable of contacting and/or engaging the holding member 46.

The active hood system 20 also includes a dampener 60. The dampener 60 includes a retention bracket 62 that houses a crushing flange 64 and a deformable material 66. The flange 64 is positioned below the deformable material 66. In some embodiments, the deformable material 66 comprises a block of aluminum honeycomb of the type disclosed in U.S. Pat. No. 6,237,955, which patent is incorporated herein by reference. However, embodiments may also be made in which other materials or features that are capable of being crushed and/or deformed are used as the deformable material 66.

A cable 70 is also added to the dampener 60. The cable 70 includes a first end 72 and a second end 74. The first end 72 is attached to the crushing flange 64 whereas the second end 74 is attached to an eyelet 76 positioned on the vehicle hood 22.

The dampener 60 is constructed such that during a portion of the deployment of the actuator 34, the dampener 60 operates to dampen the movement of the vehicle hood 22 into the elevated position 24. As will be discussed in greater detail below, this dampening occurs by crushing the dampening material 66 between the flange 64 and the retention bracket 62.

Figure 2:
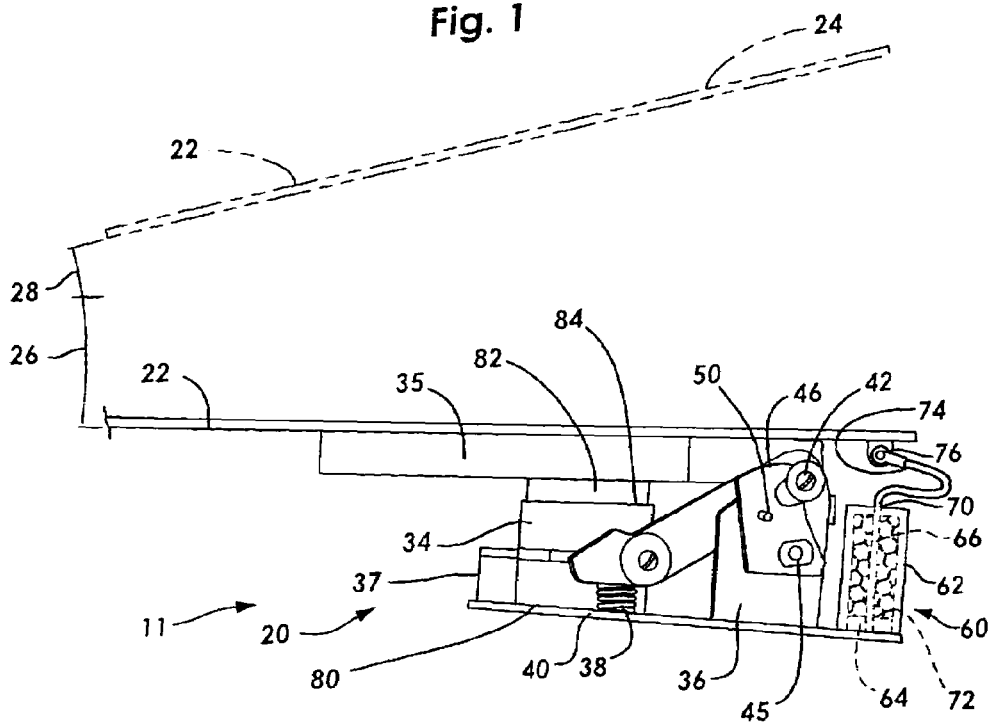
FIG. 2 is a side elevation view that illustrates initial deployment and release of the shear pin of the active hood system shown in FIG. 1.

Referring now to FIG. 2, the operation of the active hood system 20 will be described in greater detail. In the event that a sensor (not shown) detects a collision or accident between a pedestrian and the vehicle 11, a signal will be sent to the actuator 34. This signal causes the actuator 34 to produce a volume of inflation gas (not shown) and deploy.

As the actuator 34 begins to deploy, the actuator 34 applies a load or force onto the locking member 48. Such loading of the locking member 48 will break and/or unlock the locking member 48. In the embodiment shown in FIG. 2 in which the locking member 48 comprises the shear pin 50, the application of the load to the shear pin 50 operates to break the shear pin 50.

Once the locking member 48 has been broken or unlocked, the deployment of the actuator 34 rotates the holding member 46 about the locking rotation pin 45 such that all or a portion of the holding member moves towards the actuator 34. In turn, such movement of the holding member 46 disengages the holding member 46 from the pin 42 and unlocks the linkages 44.

In the embodiment shown in FIG. 2, the active hood system 10 is further designed such that deployment of the actuator 34 also moves a bottom portion 80 of the actuator 34 towards the base 40 and/or away from the hinge 36. However, such a feature is not limiting. Other embodiments may also be made in which the deployment of the actuator 34 also moves a bottom portion 80 of the actuator 34 away from the base 40 and/or towards the hinge 36. Yet further embodiments may be made in which the position of the bottom portion 80 remains constant throughout the deployment of the actuator 14.

Referring still to FIG. 2, the actuator 34 includes one or more telescoping stages 82. The stages 82 are positioned on the interior of the actuator 34 when the actuator 34 is in the pre-expanded configuration. However, as illustrated in FIG. 2, when the actuator 34 is deployed into the expanded configuration, the stages 82 extend from a top portion 84 of the actuator 34. In some embodiments, the actuator 34 is constructed such that the stage 82 with the largest diameter has a diameter that is equal to about two inches.

Figure 3:
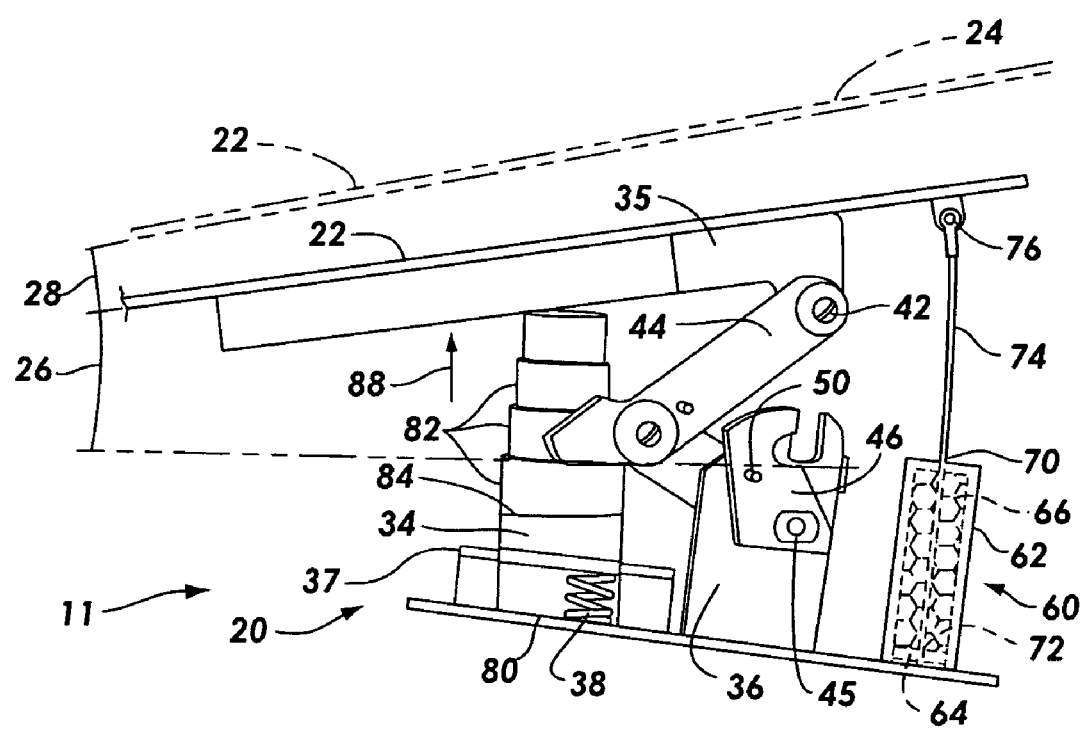
FIG. 3 is a side elevation view that illustrates the active hood system of FIG. 1 after the vehicle hood has been moved through a first travel distance.

Referring now to FIG. 3, the movement of the vehicle hood 22 through the first travel distance 26 is depicted. As can be seen in FIG. 3, as the actuator 34 is deployed the stages 82 exert an upward force (represented graphically by an arrow 88) upon the vehicle hood 22. It is this application of the upwardly directed force 88 that causes the vehicle hood 22 to move through the first travel distance 26.

In the embodiment depicted in FIG. 3, the first travel distance 26 is shown as being more than (i.e. greater than) the second travel distance 28. However, other embodiments may also be made in which the first travel distance 26 is less than (i.e. smaller than) the second travel distance 28. Still additional embodiments may also be made in which the first travel distance 26 is equal to the second travel distance 28.

The active hood system 20 shown in FIG. 3 is further constructed such that the dampener 60 does not dampen or otherwise affect the movement of the vehicle hood 22 through the first travel distance 26. Rather, the active hood system 20 is constructed such that the movement of the vehicle hood 22 through the first travel distance 26 removes the slack from the cable 70. However, other embodiments may also be made in which the dampener 60 operates to dampen the movement of the vehicle hood 22 through the first travel distance 26.

FIG. 3 also illustrates the movement of the linkages 44 as the actuator 34 is being deployed. As described above in greater detail, the deployment of the actuator 34 unlocks the linkages 44 by disengaging the holding member 46 from the pin 42. Once the linkages 44 have been unlocked, the active hood system 20 is designed such that the movement of the vehicle hood 22 through the first travel distance 26 also operates to upwardly move the linkages 44 out of the contracted position.

Figure 4:
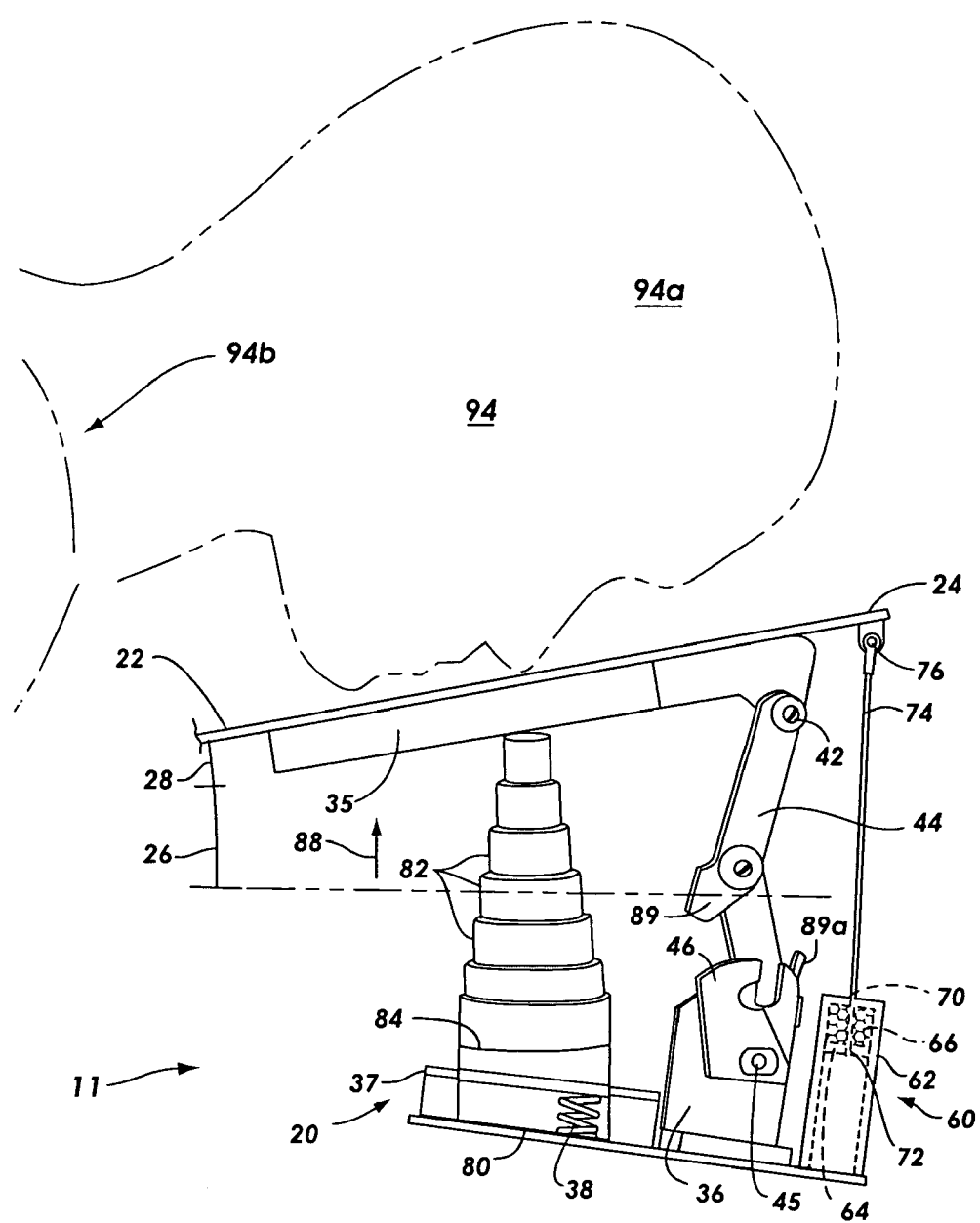
FIG. 4 is side elevation view that illustrates a pedestrian and the active hood system of FIG. 1 in which the vehicle hood has moved through a second travel distance.

Referring now to FIG. 4, the movement of the vehicle hood 22 through the second travel distance 28 and into the elevated position 24 is depicted. FIG. 4 also shows a pedestrian 94. (Note that the system 20 is not deployed while the pedestrian is on the hood 22. Rather, the system 20 deploys prior to the pedestrian 94 contacting the hood 22). The movement of the hood 22 by the system 20 softens the impact of the pedestrian 94 with the hood 22. More specifically, such movement of the hood 22 softens the impact of the pedestrian's head 94a and/or torso 94b with the hood 22. As with FIG. 3, the movement of the vehicle hood 22 through the second travel distance 28 is caused by the stages 82 being extended from of the actuator 34. More specifically, as the stages 82 are being extended from the actuator 34, the stages 82 exert an upward force 88 on the vehicle hood 22 that pushes and/or moves the vehicle hood 22 through the second travel distance 28.

As illustrated in FIG. 4, the movement of the vehicle hood 22 through the second travel distance 28 also moves the linkages 44 into a fully extended position. One or more tabs 89, 89a may also be added to the hinge 36 and/or the linkages 44 to ensure that the movement of the vehicle hood 22 through the second travel distance 28 does not over-extend the linkages 44.

In the embodiment shown in FIG. 4, the active hood system 20 is constructed such that as the vehicle hood 22 moves through the second travel distance 28, the movement of the hood 22 is dampened by the dampener 60. This dampening may be accomplished by crushing the deformable material 66 between the flange 64 and the retention bracket 62. More particularly, as the vehicle hood 22 moves through the second travel distance 28, the upward movement of the hood 22 tensions the cable 70. In turn, the tensioned cable 70 pulls the flange 64 such that the flange 64 moves and crushes the deformable material 66 between the retention bracket 62 and the flange 64. This crushing of the deformable material 66 dissipates a portion of the energy of the hood 22 and dampens the movement of the vehicle hood 22.

The system 20 may additionally be constructed such that when the hood 22 is impacted by the pedestrian 94, the force of the impact will compress a portion of the actuator 34 and/or the stages 82. In some embodiments, such compression of the actuator 34 and/or stages operates to further dissipate some of the energy of the impact.

Figure 5:
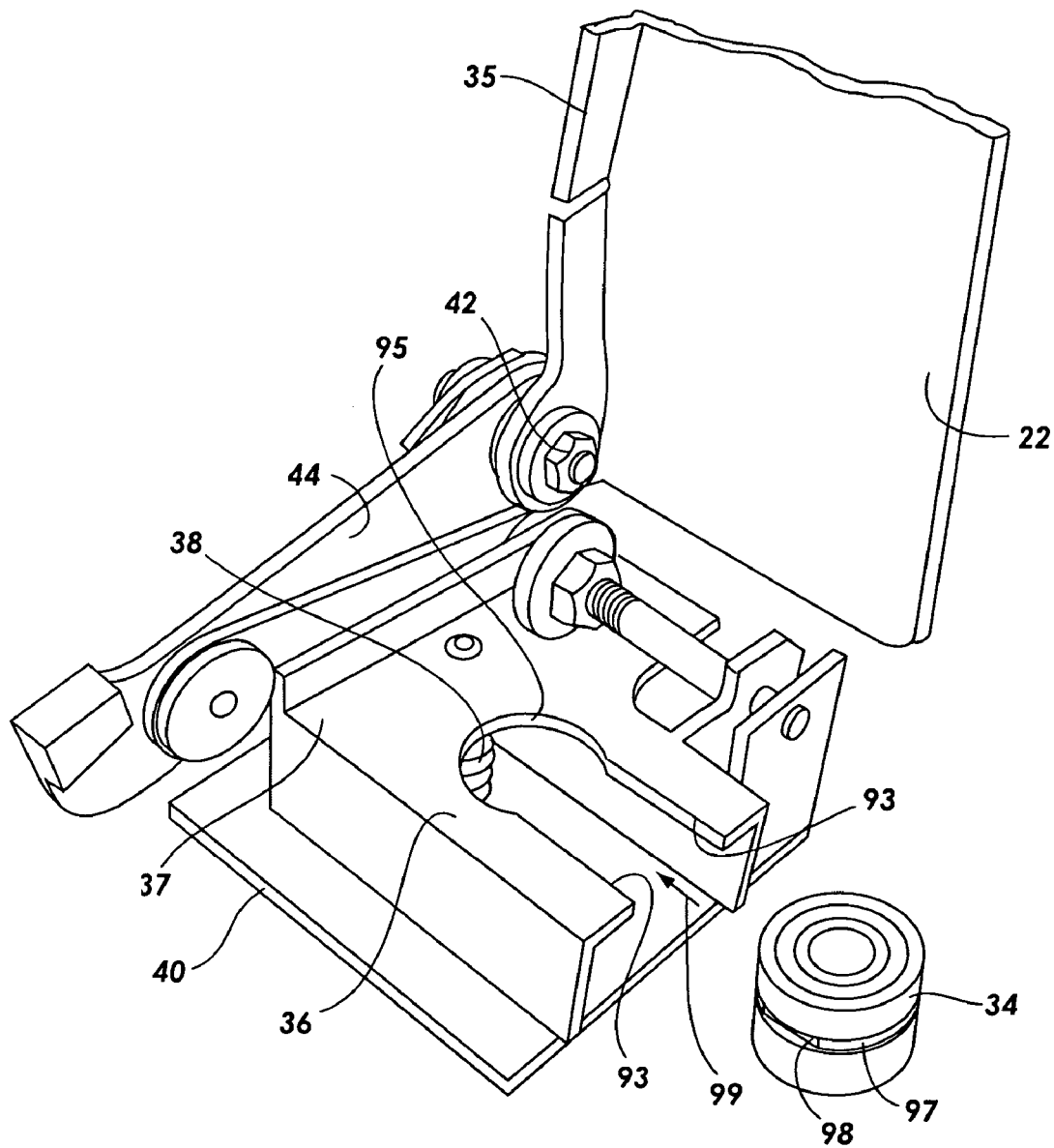
FIG. 5 is a perspective view that further illustrates the active hood system of FIG. 1.

FIG. 5 is a perspective view that illustrates additional features that may be added to the actuator 34 and/or the hinge 36. As shown in FIG. 5, the actuator supporting member 37 may include at least one slot 93 that extends into a central aperture 95. The central aperture 95 is sized and configured to receive and hold the actuator 34. Additionally, the actuator 34 may additionally comprise a cylindrical groove 97 with one or more mating flats 98 that have been machined into the groove 97. The groove 97 is a depression in the exterior of the actuator 34 whereas the mating flats 98 are sections of the groove 97 that have a perpendicular cross-section.

FIG. 5 also illustrates a method by which the actuator 34 may be attached and/or mounted to the hinge 36. Specifically, such attachment occurs by aligning the flats 97 on the actuator 34 with the slot 93 on the supporting member 37. When the flats 98 have been aligned, the actuator 34 may then be slid into the central aperture 95 as illustrated by the arrow 99. Once the actuator 34 has been positioned within the aperture 95, the actuator 34 may then be rotated so that the flats 98 are no longer aligned with the slot 93. Such rotation of the actuator 34 allows the actuator 34 to be tightly retained within the aperture 95.

The above-recited method for attaching the actuator 34 to the hinge 36 also provides an easy mechanism for removing the actuator 34 from the hinge 36. Such removal of the actuator 34 after deployment of the actuator 34 and/or during routine maintenance of the active hood system 20. In order to remove the actuator 34, the actuator 34 within the aperture 95, the actuator 34 is first rotated so that the flats 98 are aligned with the slot 93. When the flats 98 are aligned, the actuator 34 may then be removed from the supporting member by having the actuator 34 slide through the slot 93 in the direction opposite the arrow 99. Once the actuator 34 has been removed, a new actuator 34 may then be installed into the active hood system 20, and system 20 may be used again. The locking member 48 may also be re-installed onto the system 20 to ensure that the holding member 46 holds the linkages 44 in a contracted position.

While FIG. 5 shows one easy method for attaching the actuator 34 to the hinge 36, those of skill in the art will recognize that other embodiments may also be made in which the actuator 34 is not attached to the hinge 36. Further embodiments may be made in which the actuator 34 is attached to the hinge 36 through methods and/or systems that differ from that which is illustrated in FIG. 5. For example, embodiments may also be made in which the actuator 34 is held within the aperture 95 by a spring clip, a cinch nut, or another similar feature. Additional embodiments may have the actuator 34 include a threaded nut that will engage a threaded actuator post positioned within the aperture 95. Yet further embodiments may attach the actuator 34 to the hinge 36 and/or the aperture 95 via fasteners, welding, or other similar methods.

Figure 6:
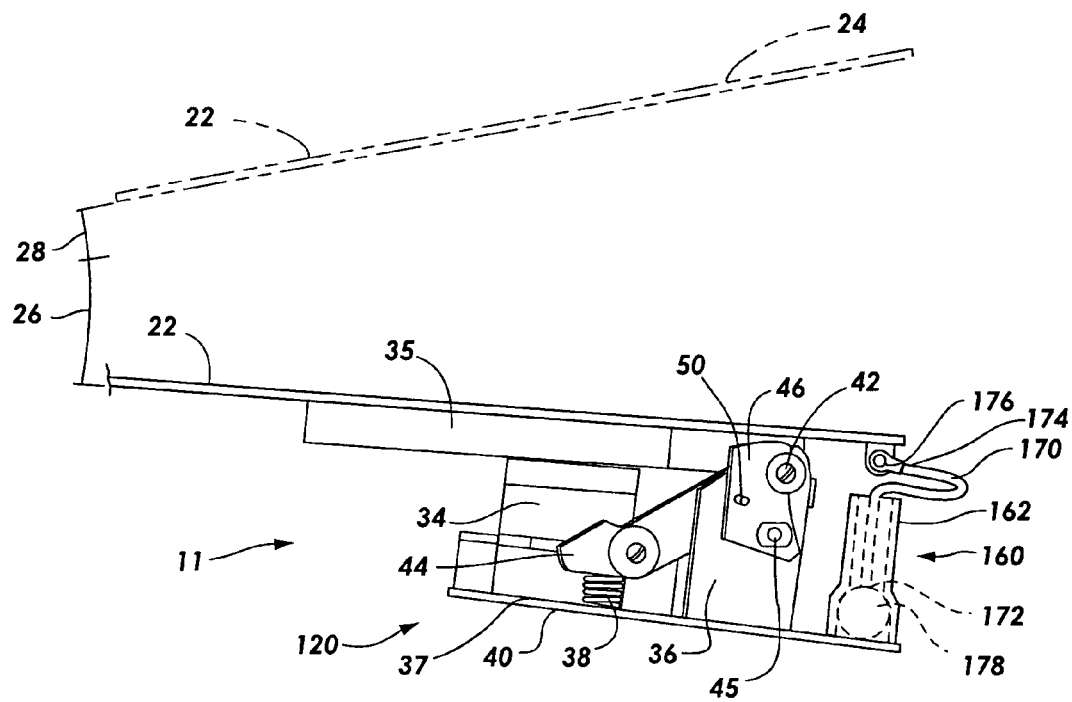
FIG. 6 is a side elevation view that illustrates another embodiment of an active hood system according to the present invention.

Referring now to FIG. 6, an additional embodiment of the present invention is depicted. FIG. 6 shows an active hood system 120 in its undeployed, pre-expanded configuration. The active hood system 120 is similar to the active hood system 20 discussed in conjunction with FIGS. 1-5. In fact, the only difference between the embodiment shown in FIG. 6 and the embodiment shown in FIGS. 1-5 is that in FIG. 6, the active hood system 120 includes a dampener 160 as opposed to the dampener 60 discussed above.

The dampener 160 is constructed such that during a portion of the deployment of the actuator 34, the dampener 160 operates to dampen the movement of the vehicle hood 22 into the elevated position 24. In some embodiments, the dampener 160 is similar to and/or based upon the technology disclosed in one or more of the following patents: U.S. Pat. No. 5,235,734, U.S. Pat. No. 4,867,003, U.S. Pat. No. 3,788,148, and U.S. Pat. No. 3,392,599, which patents are expressly incorporated herein by reference.

Specifically, the dampener 160 includes a deformable tube 162 that is connected to the base 40 and/or a portion of the vehicle (not shown). The dampener 160 also includes a cable 170 having first end 172 and a second end 174. The first end 172 is positioned within the deformable tube 162 whereas the second end 174 is attached to an eyelet 176 that is positioned on the vehicle hood 22.

A deforming ball 178 is also added to the dampener 160. The deforming ball 178 is attached to the first end 172 and is positioned within the deformable tube 162. As will be discussed in greater detail below, the deforming ball 178 is constructed such that it may dampen the movement of the actuator 34 by deforming and/or crushing the deformable tube 162.

Figure 7:
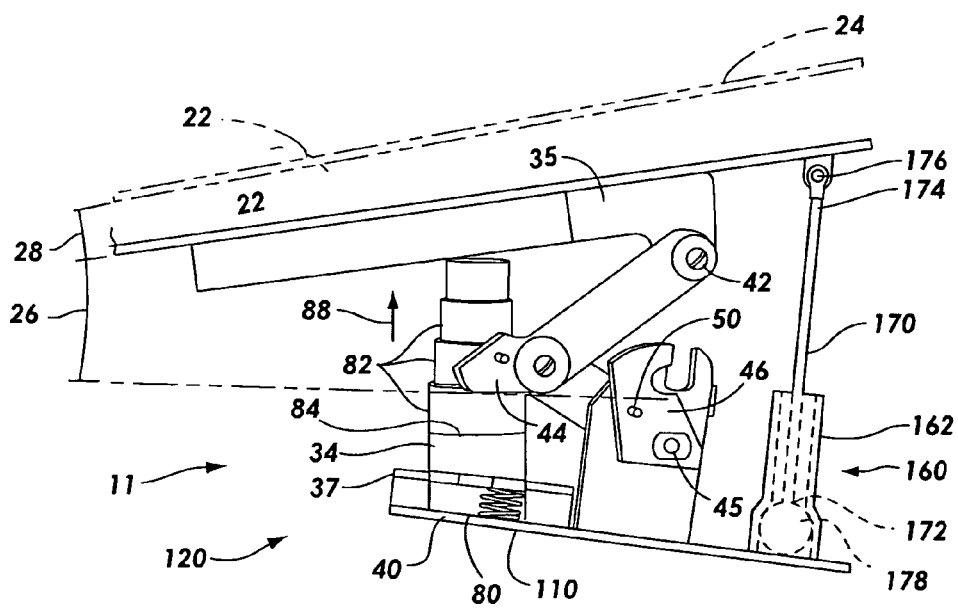
FIG. 7 is a side elevation view that illustrates the active hood system of FIG. 6 after the vehicle hood has been moved through a first travel distance.

Referring now to FIG. 7, the active hood system 20 is illustrated after the actuator 34 has moved the vehicle hood 22 through the first travel distance 26. Specifically, as the actuator 34 is deployed, the stages 82 exert an upward force (represented graphically by an arrow 88) upon the vehicle hood 22. It is this application of the upwardly directed force 88 that causes the vehicle hood 22 to move through the first travel distance 26.

In the embodiment shown in FIG. 7, the active hood system 120 is constructed such that the dampener 160 does not dampen or otherwise affect the movement of the vehicle hood 22 through the first travel distance 26. Rather, the active hood system 120 is constructed such that the movement through the first travel distance 26 removes the slack from the cable 170. However, other embodiments may also be made in which the dampener 160 operates to dampen the movement of the vehicle hood 22 through the first travel distance 26.

Figure 8:
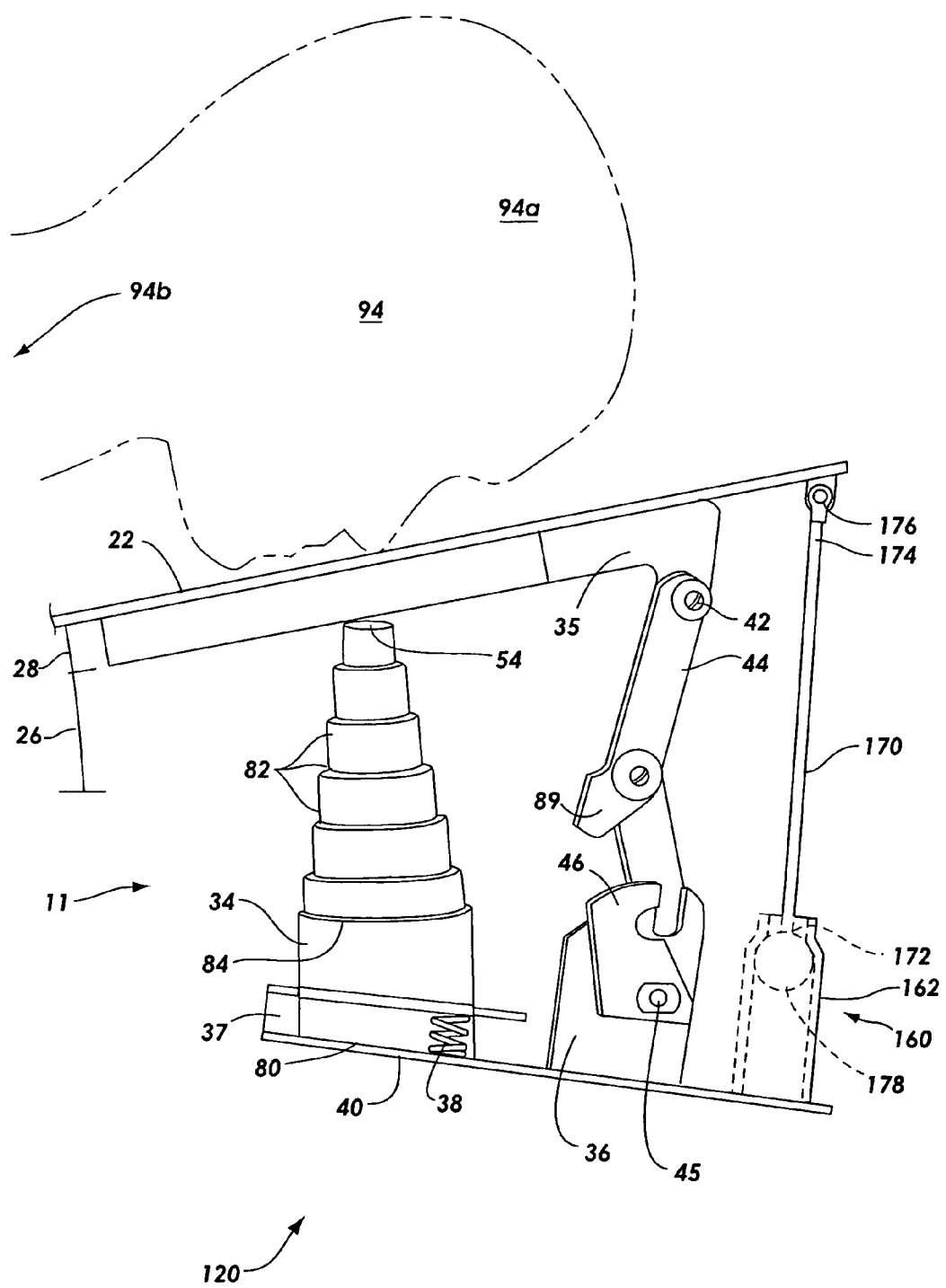
FIG. 8 is side elevation view that illustrates a pedestrian and the active hood system of FIG. 6 in which the vehicle hood has moved through a second travel distance.

Referring now to FIG. 8, the active hood system 120 is illustrated after the vehicle hood 22 has been moved through the second travel distance 28 into the elevated position 24. As with FIG. 7, the movement of the vehicle hood 22 through the second travel distance 28 is caused by the stages 82 being extended from the actuator 34. More specifically, as the stages 82 are being extended from the actuator 34, the stages 82 exert an upward force 88 on the vehicle hood 22 that pushes and/or moves the vehicle hood 22 through the second travel distance 28.

Like the embodiment shown in FIGS. 1-5, the active hood system 120 is constructed such that as the vehicle hood 22 moves through the second travel distance 28, the dampener 160 dampens the movement of the hood 22. This dampening may be accomplished by deforming the deformable tube 162. More particularly, as the vehicle hood 22 moves through the second travel distance 28, the upward movement of the hood 22 tensions the cable 170. This tensioned cable 170 then pulls the deforming ball 178 upwards and causes the deforming ball 178 to deform all or a portion of the deformable tube 162. In turn, this deforming of the deformable tube 162 dissipates a portion of the energy of the hood 22 and dampens the movement of the vehicle hood 22.

Figure 9:
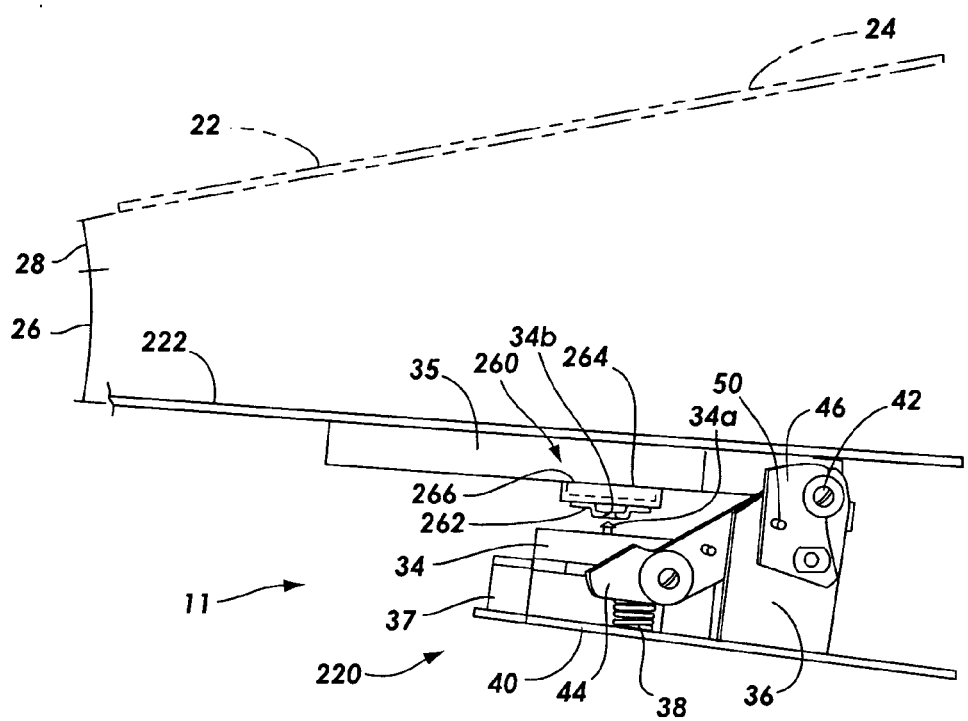
FIG. 9 is a side elevation view that illustrates a further additional embodiment of an active hood system according to the present invention.

Referring now to FIG. 9, a further embodiment of the present invention is depicted. FIG. 9 shows an active hood system 220 in its undeployed, pre-expanded configuration. The active hood system 220 is similar to the active hood systems 20, 120 described above in conjunction with FIGS. 1-8. In fact, the only differences between the embodiment shown in FIG. 9 and the embodiments shown in FIGS. 1-8 is that in FIG. 9, the vehicle hood 22 has been replaced with a new hood 222 and the dampener 60, 160 has been replaced with a new dampener 260.

The vehicle hood 222 that is used as part of the active hood system 220 is similar to the vehicle hood 22 that is discussed above. Accordingly, the vehicle hood 222 is capable of being raised into the elevated position 24 (shown in phantom lines) in order to soften the impact between the pedestrian 94 (not shown in FIG. 9) and the vehicle (not shown). More specifically, the active hood system 220 is constructed such that during a pedestrian/vehicle collision, the active hood system 220 will deploy the actuator 34 and raise the hood 222 into an elevated position 24 (shown in phantom) by having the hood 222 move through the first travel distance 26 and the second travel distance 28.

The actuator 34 may also include a retention stake 34a and the hood 222 may also include a receiving area 34b that is designed to receive the stake 34a. Specifically, the system 220 is designed such that when the actuator 34 is deployed, the actuator 34 will engage the hood 222 by having the stake 34a engage and/or be inserted into the receiving area 34b.

Like the embodiments described above, the embodiment shown in FIG. 9 has been constructed such that the first travel distance 26 is greater than the second travel distance 28. However, other embodiments may also be constructed in which the first travel distance 26 is less than the second travel distance 28. Still further embodiments may be constructed in which the first travel distance 26 is equal to the second travel distance 28.

Like the embodiments described above, the dampener 260 is constructed such that during a portion of the deployment of the actuator 34, the dampener 260 operates to dampen the movement of the vehicle hood 222 into the elevated position 24. However, unlike the previously described dampeners 60, 160, the dampener 260 includes a dampening bellows 262 that has an upper surface 264 and a lower surface 266. The upper surface 264 is attached to the vehicle hood 222 whereas the lower surface 266 is attached to the top portion 84 of the actuator 34. Of course in other embodiments, the lower surface 266 may be attached to one or more of the stages 82 (not shown in FIG. 9) and/or another portion of the actuator 34.

Figure 10:
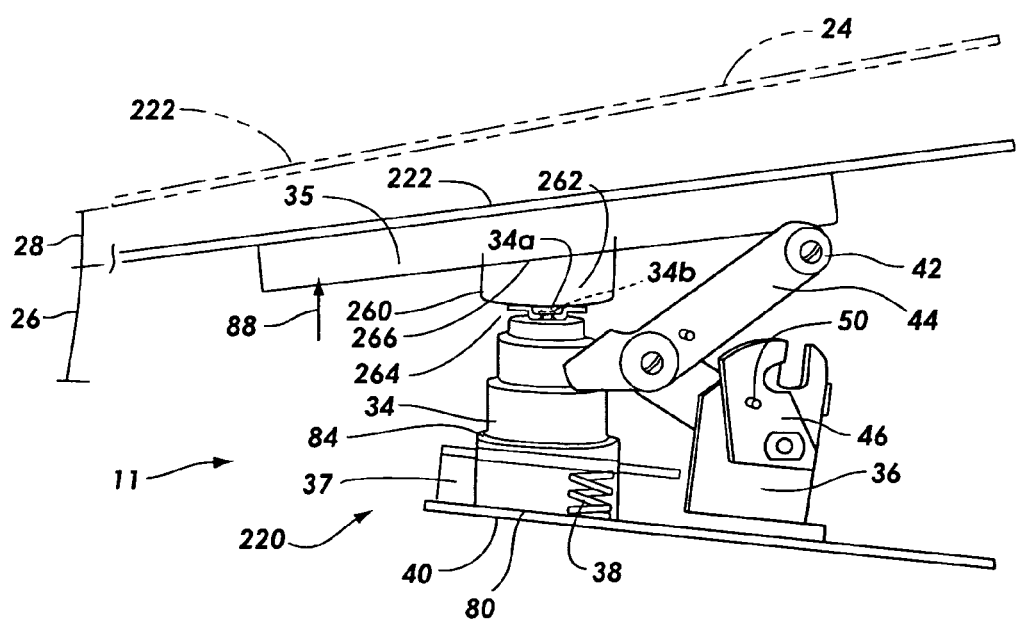
FIG. 10 is a side elevation view that illustrates the active hood system of FIG. 9 after the vehicle hood has been moved through a first travel distance.

Referring now to FIG. 10, the active hood system 220 is illustrated after the actuator 34 has moved the vehicle hood 222 through the first travel distance 26. Specifically, as the actuator 34 is deployed, the stages 82 exert an upward force (represented graphically by an arrow 88) upon the vehicle hood 222. It is this application of the upwardly directed force 88 that causes the vehicle hood 222 to move through the first travel distance 26.

In the embodiment shown in FIG. 10, the active hood system 220 is constructed such that the dampener 260 does not dampen or otherwise affect the movement of the vehicle hood 222 through the first travel distance 26. However, other embodiments may also be made in which the dampener 260 operates to dampen the movement of the vehicle hood 222 through the first travel distance 26.

Figure 11:
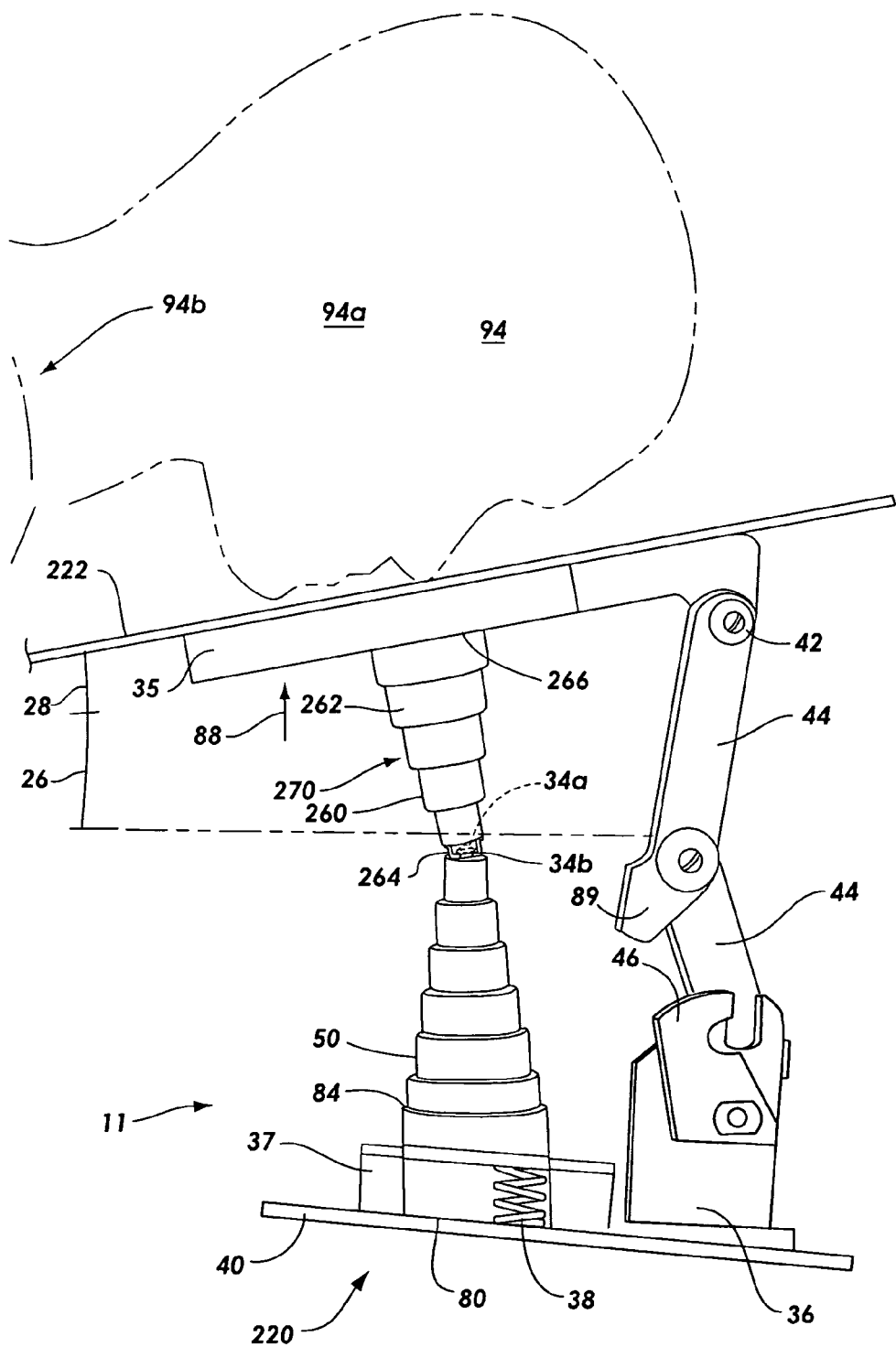
FIG. 11 is side elevation view that illustrates a pedestrian and the active hood system of FIG. 9 in which the vehicle hood has moved through a second travel distance.

Referring now to FIG. 11, the active hood system 220 is illustrated after the vehicle hood 222 has been moved through the second travel distance 28 into the elevated position 24. As with FIG. 10, the movement of the vehicle hood 222 through the second travel distance 28 is caused by the stages 82 being extended from the actuator 34. More specifically, as the stages 82 are being extended from the actuator 34, the stages 82 exert an upward force 88 on the vehicle hood 222 that pushes and/or moves the vehicle hood 222 through the second travel distance 28.

Like the embodiments discussed above, the active hood system 220 is constructed such that as the vehicle hood 222 moves through the second travel distance 28, the dampener 260 dampens the movement of the hood 222. Such dampening may be accomplished by opening the bellows 262. More particularly, as the vehicle hood 222 moves through the second travel distance 28, the kinetic energy and/or the inertia of the hood 222 causes the bellows 262 to open into an expanded configuration 270. This expansion of the bellows 262 dissipates some of the kinetic energy of the hood 222 and operates to dampen the movement of the hood 222.

Figure 12:
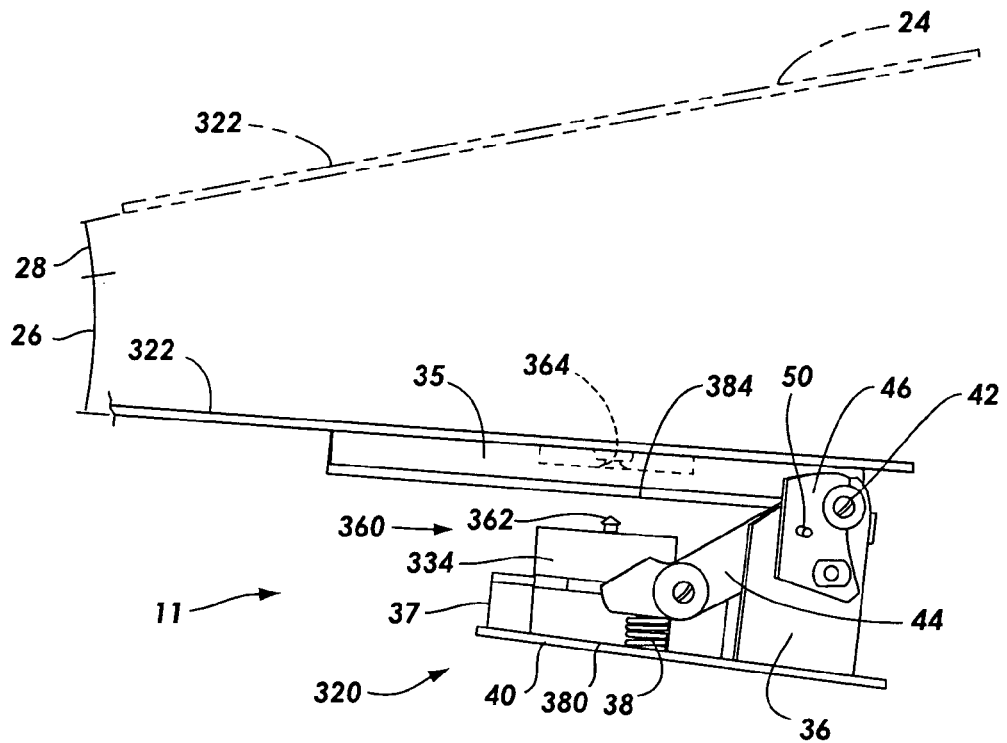
FIG. 12 is a partially cutaway side elevation view that illustrates a yet further embodiment of an active hood system according to the present invention.

Referring now to FIG. 12, a further embodiment of the present invention is depicted. FIG. 12 shows an active hood system 320 in its undeployed, pre-expanded configuration. The active hood system 320 is similar to the active hood systems 20, 120, 220 described above in conjunction with FIGS. 1-11. In fact, the only differences between the embodiment shown in FIG. 12 and the embodiments shown in FIGS. 1-11 is that in FIG. 12, the vehicle hoods 22, 222 have been replaced with a new hood 322, the actuator 34 has been replaced by a new actuator 334, and the dampeners 60, 160, 260 have been replaced with a new dampener 360.

The vehicle hood 322 that is used as part of the active hood system 320 is similar to the vehicle hoods 22, 222 discussed above. Accordingly, the vehicle hood 322 is capable of being raised into the elevated position 24 (shown in phantom lines) in order to soften the impact between the pedestrian 94 (not shown in FIG. 12) and the vehicle (not shown). More specifically, the active hood system 320 is constructed such that during a pedestrian/vehicle collision, the active hood system 320 will deploy the actuator 334 and raise the hood 322 into an elevated position 24 (shown in phantom) by having the hood 322 move through the first travel distance 26 and the second travel distance 28.

Furthermore, the actuator 334 that is used as part of the active hood system 320 is similar to the actuator 34 discussed above. The actuator has a top portion 384 and a bottom portion 380. The actuator 334 includes one or more telescoping stages 382 (shown in FIG. 13) that are positioned on the interior of the actuator 334 when the actuator 334 is in the pre-expanded configuration. The actuator 334 is designed such that when the actuator 334 is deployed, the stages 382 will extend from a top portion 384 of the actuator 334 and move the vehicle hood 322 through the first travel distance 26 and the second travel distance 28 (see FIGS. 13 and 14).

Like the embodiments described above, the dampener 360 is constructed such that during a portion of the deployment of the actuator 334, the dampener 360 operates to dampen the movement of the vehicle hood 322 into the elevated position 24. However, unlike the previously described dampeners 60, 160, 260, the dampener 360 comprises a retention stake 362. The retention stake 362 is connected to and/or positioned on the top portion 384. Of course, other embodiments may also be made in which the retention stake 362 is attached to one or more of the stages 382 and/or another portion of the actuator 334.

A stake retention hole 364 that is designed to receive the retention stake 362 is also added to the active hood system 320. The stake retention hole 364 is added to the vehicle hood 322. Specifically, the stake retention hole 364 is added to the vehicle hood 322 and is configured such that the position of the stake retention hole 364 corresponds to the position of the retention stake 362.

Figure 13:
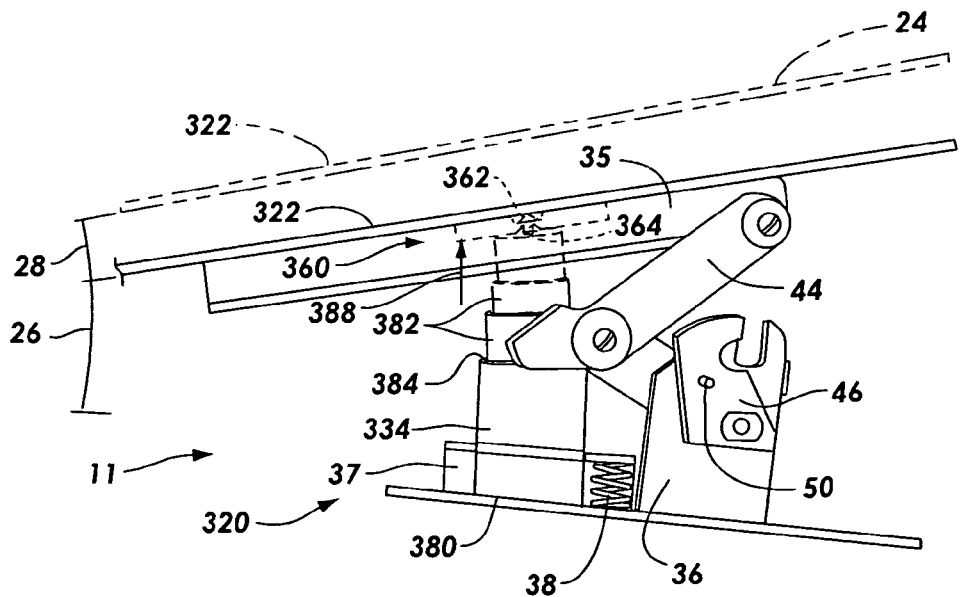
FIG. 13 is a partially cutaway side elevation view that illustrates the active hood system of FIG. 12 after the vehicle hood has been moved through a first travel distance.

Referring now to FIG. 13 the active hood system 320 is illustrated after the actuator 334 has moved the vehicle hood 322 through the first travel distance 26. Specifically, as the actuator 334 is deployed, the stages 382 exert an upward force (represented graphically by an arrow 388) upon the vehicle hood 322. It is this application of the upwardly directed force 388 that causes the vehicle hood 322 to move through the first travel distance 26.

In the embodiment shown in FIG. 13, the active hood system 320 is constructed such that the dampener 360 does not dampen or otherwise affect the movement of the vehicle hood 322 through the first travel distance 26. Rather, as shown in FIG. 13, the deployment of the actuator 334 and/or the movement of the vehicle hood 322 through the first travel distance 26 does not affect the stake 362 or the stake retention hole 364. Of course, other embodiments may also be made in which the movement of the vehicle hood 322 through the first travel distance 26 operates to lockingly engage the retention stake 362 within the stake retention hole 364. Still further embodiments may be made in which the dampener 360 dampens the movement of the vehicle hood 322 through the first travel distance 26.

Figure 14:
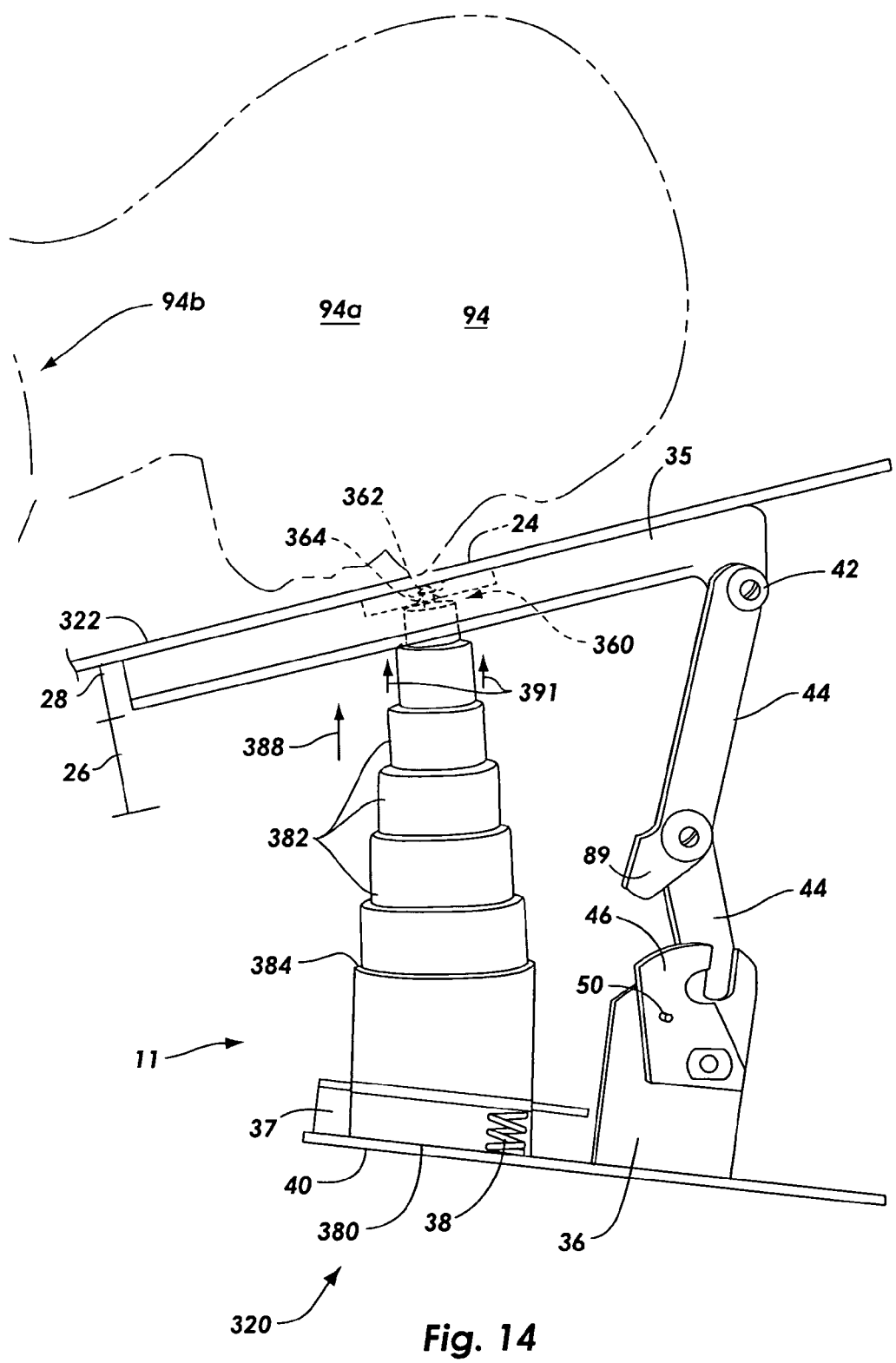
FIG. 14 is partially cutaway side elevation view that illustrates a pedestrian and the active hood system of FIG. 12 in which the vehicle hood has moved through a second travel distance.

Referring now to FIG. 14, the active hood system 320 is illustrated after the vehicle hood 322 has been moved through the second travel distance 28 into the elevated position 24. As with FIG. 13, the movement of the vehicle hood 322 through the second travel distance 28 is caused by the stages 382 being extended from the actuator 334. More specifically, as the stages 382 are being extended from the actuator 334, the stages 382 exert an upward force 388 on the vehicle hood 322 that pushes and/or moves the vehicle hood 322 through the second travel distance 28.

The active hood system 320 is constructed such that as the vehicle hood 322 moves through the second travel distance 28, the dampener 360 dampens the movement of the hood 322. Such dampening may be accomplished by the engagement between the retention stake 362 and the stake retention hole 364. More specifically, the engagement between the retention stake 362 and the stake retention hole 364 operates to connect the vehicle hood 322 with the actuator 334. Accordingly, when the vehicle hood 322 is moved through the second travel distance 28, the kinetic energy and/or inertia of the moving vehicle hood 322 expands the actuator 334 an additional distance (represented graphically by the arrows 391). It is this additional expansion 391 of the actuator 334 that operates to dampen the movement of the vehicle hood 322.

Figure 15:
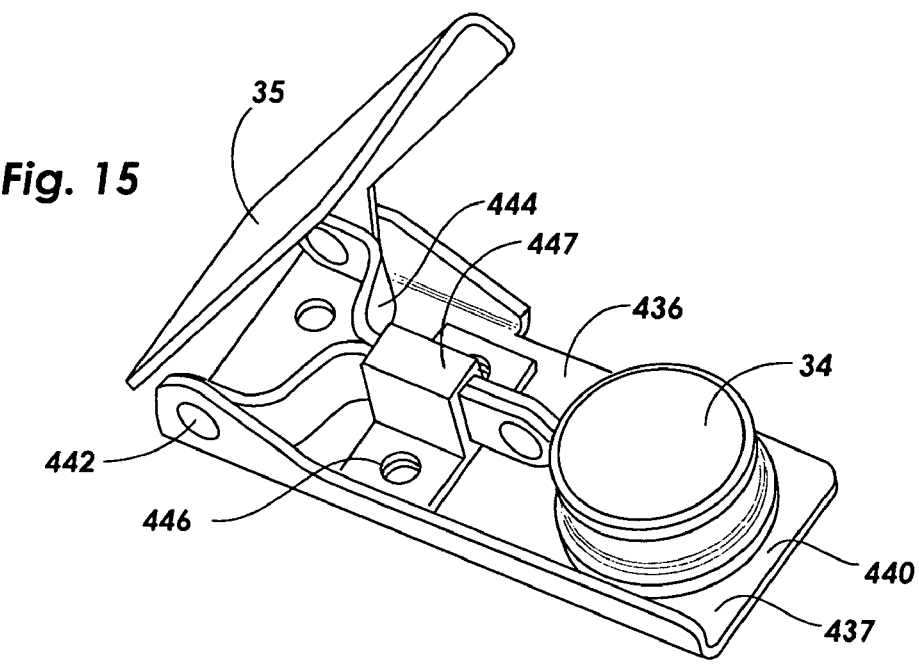
FIG. 15 is a perspective view of an additional embodiment of a hinge that may be used as part of the active hood systems of the present invention.

Referring now to FIG. 15, a perspective view of a hinge 436 is illustrated. The hinge 436 is similar to the hinge 36 discussed above. The hinge 436 is specifically designed such that it may be used as part of the active hood systems 20, 120, 220, 320. The hinge 436 shown in FIG. 15 has been attached to the actuator 34 and is constructed to extend when a vehicle hood 22 (not shown in FIG. 15) is moved into an extended position 24 (not shown in FIG. 15). Of course, those of skill in the art will recognize that other embodiments may be made in which the hinge 436 is separate from the actuator 34. Still further embodiments may be made in which the hinge 436 is attached to and/or used in conjunction with a different type of actuator, such as the actuator 334.

As with the hinge 36, the hinge 436 is also attachable to a vehicle hood 22 and may include an actuator supporting member 437. The supporting member 437 is a plate or other similar feature that is designed to support and receive the actuator 34. A spring 38 (not shown in FIG. 15) may also be added to the hinge 436. The spring is attached to the bottom of the supporting member 437. In turn, this spring may be is attached to a base 440. The base 440 is a metal sheet or plate that is designed to support and/or hold the active hood system 20, 120, 220, 320. In some embodiments, the base 440 is a portion of the vehicle. Other embodiments may also be made in which the base 440 is a separate element that is mounted to the vehicle via welding, fasteners, or other methods.

The hinge 436 may additionally include a rotation pin 442. The rotation pin 442 is configured such that a user (not shown) may open the vehicle hood 22. More specifically, the pin 442 is designed such that if the hinge 436 is attached to the hood 22, the pin 442 allows a user to raise a front portion of the hood 22 so that the user may access the vehicle's engine and engine compartment that are stored beneath the vehicle hood 22.

The hinge 436 may additionally include one or more linkages 444. The linkages 444 are bars or other similar features that are attached to the vehicle hood 22 and the pin 442. Like the embodiment described above, the linkages 444 have a contracted position and an extended position. As illustrated in FIG. 15, the linkages 444 are in the contracted position.

Referring still to FIG. 15, the hinge 436 may additionally comprise a holding member 446. The holding member 446 is designed to hold the linkages 444 in a contracted position. However, unlike the hinge 36 described above, the hinge 436 has been designed such that the holding member 446 comprises a clip 447. The clip 447 is made of plastic or other similar materials and is designed such that when the linkages 444 are in the contracted position, the clip 447 will cover all or a portion of the linkages 444.

The clip 447 is further designed such that when the actuator 34 is deployed, the actuator 34 causes the clip 447 to disengage from the linkages 444. Once the clip 447 is disengaged, the linkages 444 are free to move into the extended position in the manner described above. In some embodiments, this disengagement of the clip 447 may be accomplished by configuring the hinge 436 such that the deployment of the actuator 34 operates to break the clip 447. In other embodiments, this disengagement of the clip 447 may be accomplished by configuring the hinge 436 such that the deployment of the actuator 34 removes and/or prevents the clip 447 from covering the linkages 444.

Figure 16:
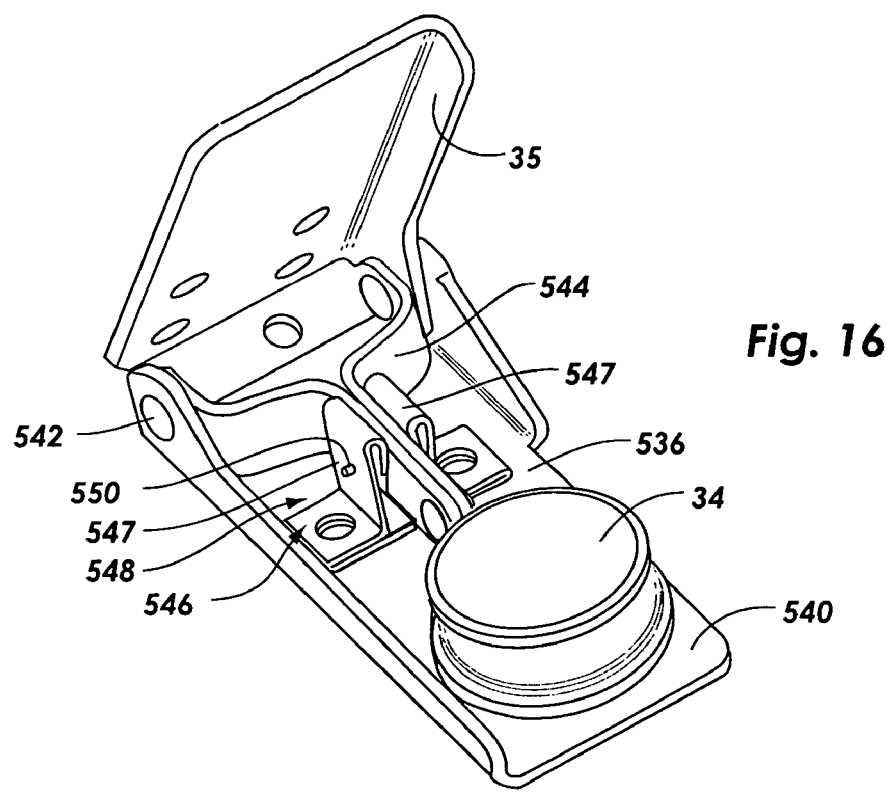
FIG. 16 is a perspective view of a further embodiment of a hinge that may be used as part of the active hood systems of the present invention.

Referring now to FIG. 16, a perspective view of a hinge 536 is illustrated. The hinge 536 is similar to the hinge 36, 436 discussed above. The hinge 536 is specifically designed such that it may be used as part of the active hood systems 20, 120, 220, 320. The hinge 536 shown in FIG. 16 has been attached to the actuator 34 and is constructed to extend when a vehicle hood 22 (not shown in FIG. 16) is moved into an extended position 24 (not shown in FIG. 16). Of course, those of skill in the art will recognize that other embodiments may be made in which the hinge 536 is separate from the actuator 34. Still further embodiments may be made in which the hinge 536 is attached to and/or used in conjunction with another type of actuator, such as the actuator 334.

As with the hinge 36, 436, the hinge 536 is attachable to a vehicle hood 22 and may include an actuator supporting member 537. The supporting member 537 is a plate or other similar feature that is designed to support and receive the actuator 34. A spring 38 (not shown in FIG. 16) may also be added to the hinge 536. The spring is attached to the bottom of the supporting member 537. In turn, this spring may be is attached to a base 540. The base 540 is a metal sheet or plate that is designed to support and/or hold the active hood system 20, 120, 220, 320. In some embodiments, the base 540 is a portion of the vehicle. Other embodiments may also be made in which the base 540 is a separate element that is mounted to the vehicle via welding, fasteners, or other methods.

The hinge 536 may additionally include a rotation pin 542. The rotation pin 542 is configured such that a user (not shown) may open the vehicle hood 22. More specifically, the pin 542 is designed such that if the hinge 536 is attached to the hood 22, the pin 542 allows a user to raise a front portion of the hood 22 so that the user may access the vehicle's engine and engine compartment that are stored beneath the vehicle hood 22.

The hinge 536 may additionally include one or more linkages 544. The linkages 544 are bars or other similar features that are attached to the vehicle hood 22 and the pin 542. Like the embodiments described above, the linkages 544 have a contracted position and an extended position. As illustrated in FIG. 16, the linkages 544 are in the contracted position.

Referring still to FIG. 16, the hinge 536 may additionally comprise a holding member 546. The holding member 546 is designed to hold the linkages 544 in a contracted position. A locking member 548 may also be added to ensure that the holding member 546 holds the linkages 544. As illustrated in FIG. 16, the locking member 548 comprises a shear pin 550. However, other embodiments may also be made in which the locking member 548 comprises a fastener or another similar feature that is capable of contacting and/or engaging the holding member 546.

As with the hinge 436 described above, the hinge 536 has been designed such that the holding member 546 comprises a clip 547. Unlike the clip 447 however, the clip 547 is made of metal and is designed such that when the linkages 544 are in the contracted position, the clip 547 will engages the sides of the linkages 544.

The clip 547 is further designed such that when the actuator 34 is deployed, the actuator 34 causes the clip 547 to disengage from the linkages 544. Once the clip 547 is disengaged, the linkages 544 are free to move into the extended position in the manner described above. In some embodiments, this disengagement of the clip 547 may be accomplished by configuring the hinge 536 such that the deployment of the actuator 34 operates to break the clip 547. In other embodiments, this disengagement of the clip 547 may be accomplished by configuring the hinge 536 such that the deployment of the actuator 34 removes and/or prevents the clip 547 from contacting the linkages 544. An additional feature of the clip 547 is that after deployment of the hood lifting system (especially in the case of a "false" deployment) and removal of actuator 34, the linkages 544 can be snapped back into place, and the vehicle in which the system is used could be driven again.

Figure 17:
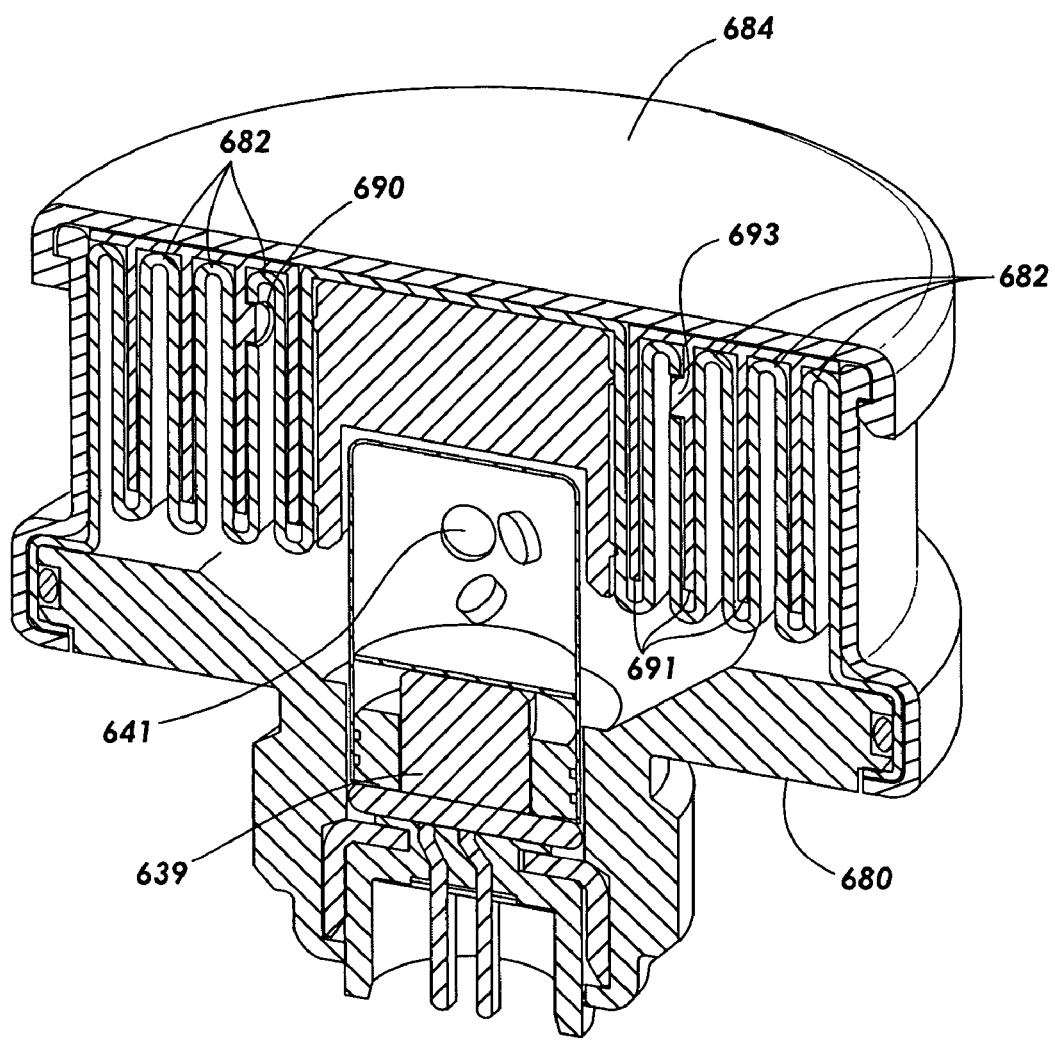
FIG. 17 is a cross-sectional view of an additional embodiment of an actuator that may be used as part of the active hood systems of the present invention.

Referring now to FIG. 17, a cross-sectional view illustrates an additional embodiment of an actuator 634. The actuator 634 is similar to the actuator 34, 334 described in conjunction with FIGS. 1-16. In fact all or the features or elements found in the actuators 34, 334, may be added to the actuator 634. Likewise all of the features or elements found in the actuators described in U.S. Patent Application Publication No. 2004/0006979 (which application, as noted above, is incorporated herein by reference) may similarly be added to the actuator 634. For purposes of clarity however, such features and elements are not illustrated in FIG. 17.

As with the actuators 34, 334, the actuator 634 comprises one or more stages telescoping 682. The stages 682 may be in either a pre-expanded configuration or an extended configuration. As shown in FIG. 17, the stages 682 are in the pre-expanded configuration. However, the actuator 634 is constructed such that when the actuator 634 is deployed, the stages 682 will convert into the extended configuration by expanding or extending through a top portion 684 of the actuator 634.

Like the actuator disclosed U.S. Patent Application Publication No. 2004/0006979, the stages 682 may be deployed via an initiator 639 and a supply of gas generant 641. More specifically, the actuator 634 is designed such that when the appropriate signal is given, the initiator 639 will ignite the gas generant 641. In turn, this ignition of the gas generant 641 produces a large volume of inflation gas (not shown). The inflation gas then pushes against the stages 682 and causes the stages to extent from the top portion 684 of the actuator 634.

Referring still to FIG. 17, the actuator 634 may additionally comprise one or more vent holes 690. The vent holes 690 are apertures or openings in the stages 682. In the embodiment shown in FIG. 17, two vent holes 690 have been added to the stages 682. However, other embodiments may also be made in which three, four, or even more than four vent holes 690 are added to the actuator 634.

The actuator 634 may further comprise one or more integral flanges 691 that seal and/or cover the vent holes 690. For purposes of clarity, one of the flanges 691 has been removed from FIG. 17 so that the vent hole 690 may be illustrated. The flanges 691 may be made of plastic, metal, nylon, or other similar materials that are capable of sealing the vent holes 690. Additional embodiments may also be made in which other methods are used for sealing the vent holes 690. For example, embodiments may also be made in which the vent holes 690 are sealed by burst disks, plugs, or any other member that engages and/or fits into the vent holes 690.

Figure 18:
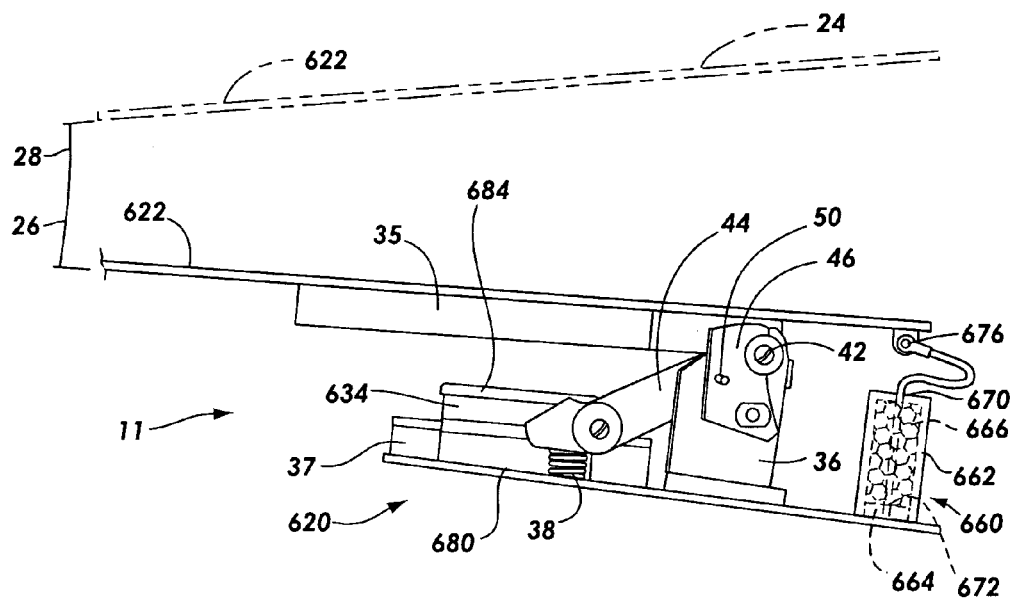
FIG. 18 is a side elevation view of an embodiment of the active hood system that incorporates the embodiment of the actuator shown in FIG. 17 (the actuator cover is not shown)

Referring now to FIG. 18, the actuator 634 is shown as part of an active hood system 620. The active hood system 620 is shown in its undeployed, pre-expanded configuration and includes the hinge 36. The active hood system 620 is similar to the active hood systems 20, 120, 220, 320 described in conjunction with FIGS. 1-14. The actuator 634 may also be used in conjunction with the hinges 436, 536 discussed in FIGS. 15 and 16.

The active hood system 620 includes a vehicle hood 622. The vehicle hood 622 is similar to the vehicle hoods 22, 222, 322 that discussed above. Accordingly, the vehicle hood 322 is capable of being raised into the elevated position 24 (shown in phantom lines) in order to soften the impact between the pedestrian 94 (not shown in FIG. 18) and the vehicle (not shown). More specifically, the active hood system 620 is constructed such that during a pedestrian/vehicle collision, the active hood system 620 will deploy the actuator 634 and raise the hood 622 into an elevated position 24 (shown in phantom) by having the hood 622 move through the first travel distance 26 and the second travel distance 28.

The active hood system 620 also includes a dampener 660. The dampener 660 is constructed such that during a portion of the deployment of the actuator 634, the dampener 660 operates to dampen the movement of the vehicle hood 622 into the elevated position 24. The dampener 660 is similar and/or identical to the dampener 60 shown in FIGS. 9-11. Accordingly, the dampener 660 includes a retention bracket 662 that houses a crushing flange 64 and a deformable material 666. The flange 664 is positioned below the deformable material 666. A cable 670 is also added to the dampener 660. The cable 670 includes a first end 672 and a second end 674. The first end 672 is attached to the crushing flange 664 whereas the second end 674 is attached to an eyelet 676 positioned on the vehicle hood 622.

Although the embodiment shown in FIG. 18 shows the actuator 634 used in conjunction with the dampener 660, other embodiments may also be made in which the actuator 634 is used with other types of dampeners. For example, embodiments may also be made in which the actuator 634 is attached to and/or used in conjunction with the dampeners 60, 160, 260, 360 discussed above in conjunction with FIGS. 1-14. Of course, yet further types of dampeners may also be used.

Figure 19:
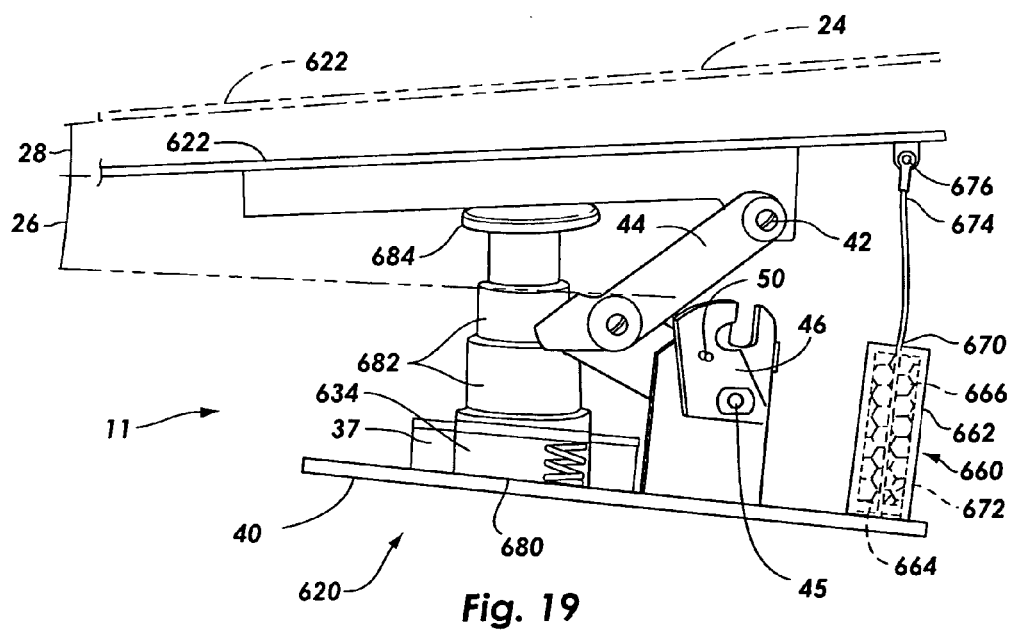
FIG. 19 is a side elevation view that illustrates the active hood system of FIG. 18 after the vehicle hood has been moved through a first travel distance.

Referring now to FIG. 19, the active hood system 620 is illustrated after the actuator 634 has moved the vehicle hood 622 through the first travel distance 26. Specifically, as the actuator 634 is deployed, the stages 682 exert an upward force (represented graphically by an arrow 688) upon the vehicle hood 622. It is this application of the upwardly directed force 688 that causes the vehicle hood 622 to move through the first travel distance 26.

In the embodiment shown in FIG. 19, the active hood system 620 is constructed such that the dampener 660 does not dampen or otherwise affect the movement of the vehicle hood 622 through the first travel distance 26. However, other embodiments may also be made in which the dampener 660 does dampen the movement of the vehicle hood 622 through the first travel distance 26.

Figure 20:
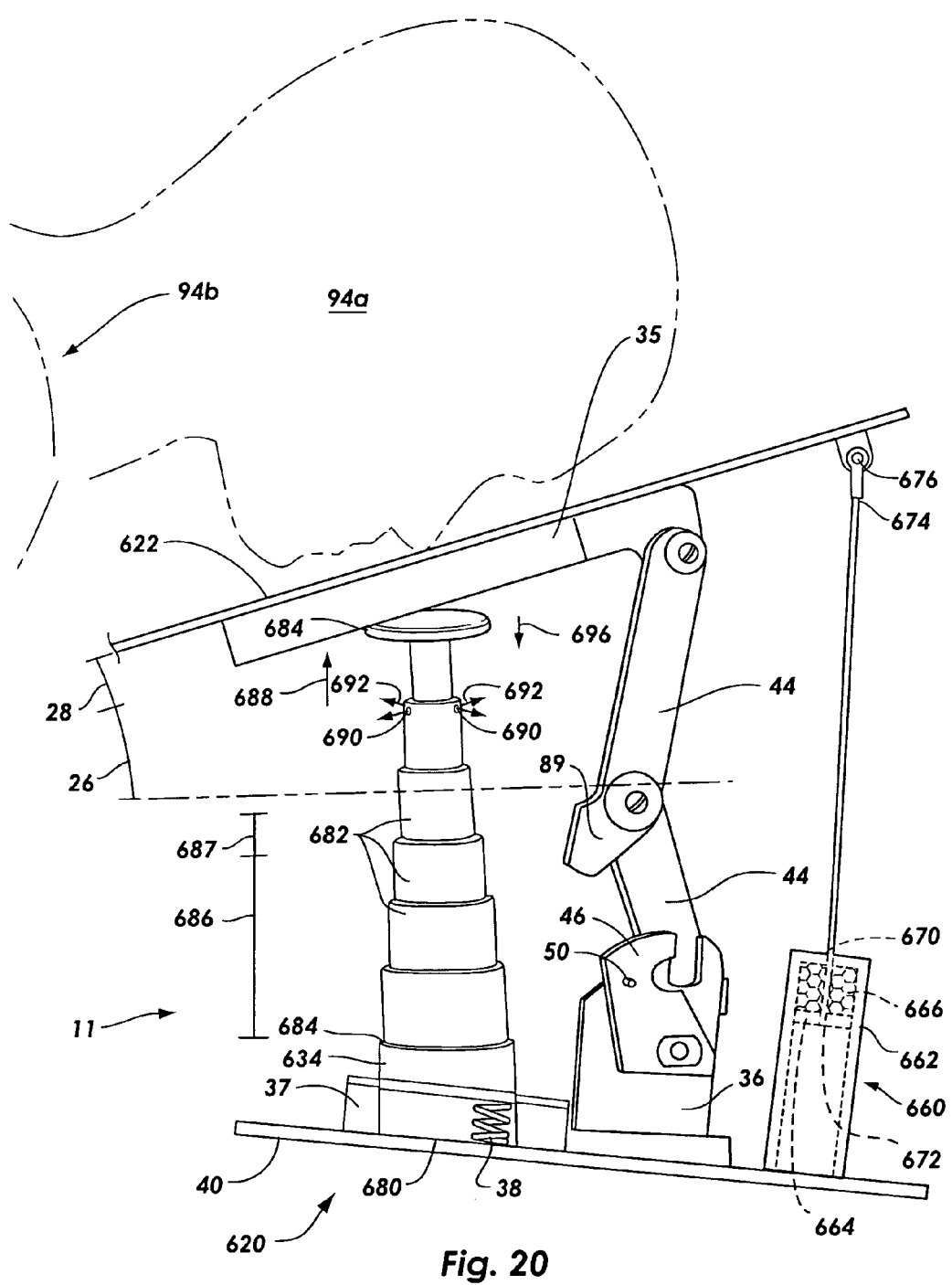
FIG. 20 is side elevation view that illustrates a pedestrian and the active hood system of FIG. 18 in which the vehicle hood has moved through a second travel distance.

Referring now to FIG. 20, the active hood system 620 is illustrated after the vehicle hood 622 has been moved through the second travel distance 28 into the elevated position 24. As with FIG. 19, the movement of the vehicle hood 622 through the second travel distance 28 is caused by the stages 682 being extended from of the actuator 34. More specifically, as the stages 682 are being extended from the actuator 34, the stages 682 exert an upward force 688 on the vehicle hood 622 that pushes and/or moves the vehicle hood 622 through the second travel distance 28.

Like the embodiments discussed above, the active hood system 620 is constructed such that as the vehicle hood 622 moves through the second travel distance 28, the dampener 660 dampens the movement of the hood 622. Such dampening may be accomplished by crushing the dampening material 666. More particularly, as the vehicle hood 622 moves through the second travel distance 28, the kinetic energy and/or the inertia of the hood 622 causes the flange 664 to move and crush the dampening material 666. Such crushing of the dampening material 666 dissipates some of the kinetic energy of the hood 622 and operates to dampen the movement of the hood 622.

As can be seen in FIG. 20, when the actuator 634 is deployed, the stages 682 are extended upwards a first distance 686 and a second distance 687. In some embodiments, the actuator 634 is further constructed such that when the stages 682 are extended out the first distance 686, the actuator 634 is sealed whereas when the stages 682 are extended out the second distance 687, the actuator 634 is unsealed. In the embodiment shown in FIG. 20, such sealing and unsealing of the actuator 634 may be accomplished via the vent holes 690. Specifically, the actuator 634 is configured such that when the stages 682 are extended out the first distance 686, the vent holes 690 are sealed by the flanges 691 (shown in FIG. 17). However, when the stages 682 are extended out the second distance 687, the flanges 691 disengage from the vent holes 690. This disengagement of the plug 691 from the vent holes 690 unseals the actuator 634. In turn, this unsealing of the vent holes 690 allow pressurized gas (illustrated graphically by arrow 692) to bleed out from the interior of the actuator 634 until the pressure on the interior of the actuator 634 is equal or substantially equal to the pressure on the exterior of the actuator 634.

In the embodiment shown in FIG. 20, the active hood system 620 is constructed such that the stages 682 will extend out the second distance 687 as the hood 622 is moved through the second travel distance 28. More specifically, the active hood system 620 is constructed such that the stages 682 will extend the second distance 687 while the hood 622 is moved through the second travel distance 28 and after the hood 622 as moved a distance that is equal to about 90 percent of the total distance traveled by the vehicle hood 622. Of course, other embodiments may also be constructed in which the stages 682 extend the second distance 687 before the vehicle hood 622 has moved a distance that is equal to about 90 percent of the total distance traveled by the vehicle hood 622. Still further embodiments may be made in which the stages 682 extend the second distance 687 after the vehicle hood 622 has moved a distance that is equal to about 90 percent of the total distance traveled by the vehicle hood 622. Yet further embodiments may be made in which the stages 682 extend the second distance 687 as the movement of the vehicle hood 622 is being dampened by the dampener 660. Other embodiments may also be constructed in which the stages 682 extend the second distance as the hood 622 is moved through the first distance 26.

Although the embodiment shown in FIG. 20 has been constructed such that the actuator 634 is unsealed by removing the flanges 691 from the vent holes 690, other methods of unsealing the actuator 634 may also be used. For example, embodiments may be used in which the actuator 634 is unsealed via puncturing. In some embodiments, this puncturing of the actuator 634 may be accomplished by rupturing a burst disk and/or a plug that is used to cover and/or seal one or more of the vent holes 690. Such puncturing of the actuator 634 may occur while the hood 622 is moved through the first travel distance 26 and/or the second travel distance 28. Still additional embodiments may be made such that when the actuator 634 is unsealed, the actuator 634 looses its ability to move the hood 622.

By constructing the actuator 634 such that the gas 692 may be vented out as the actuator 634 is being deployed, additional advantages and/or cushioning to the pedestrian 94 may be achieved during a during a pedestrian/vehicle collision. Specifically, when the pedestrian 94 impacts the vehicle hood 622 during a pedestrian/vehicle collision, the pedestrian 94 will impart a compressive load (represented graphically by an arrow 696) onto the vehicle hood 622. Since the actuator 634 has been de-pressurized through the venting of the gas 692 through the vent holes 690, this load 696 will compress the actuator 634 by forcing the stages 682 into the interior of the actuator 634. In turn, this compression of the stages 682 dampens a portion of the energy of the collision and softens the impact between the pedestrian 94 and the vehicle hood 622. Additional attenuation of energy may be achieved by configuring the active hood system 620 such that the momentum of the moving hood 622 pulls the stages 682 out some distance from the top portion 684 of the actuator 634.

In summary, the present invention provides a novel active hood system that reduces the severity of a pedestrian/vehicle collision. As such, many of the limitations associated with known active hood systems may be effectively eliminated.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An active hood system comprising:
   an actuator attachable to a vehicle, the actuator being capable of moving the vehicle hood from a first position to a second, elevated position; and
   a dampener constructed to dampen the movement of the vehicle hood when said hood is actuated from the first position to the second position, wherein the dampener comprises a deformable material housed within a retention bracket; a retention flange positioned within the retention bracket; and, a cable connected the retention flange, the cable being attachable to the vehicle hood.

2. An active hood system as in claim 1 wherein the system is designed such that impact between a pedestrian and a vehicle hood causes the actuator to compress.

3. An active hood system as in claim 1 wherein the deformable material is positioned such that if the vehicle hood is moved into the elevated position, the dampening material is crushed between the retention flange and the retention bracket.

4. An active hood system as in claim 1 further comprising a hinge that is connected to or positioned proximate the actuator, the hinge constructed to extend when the hood is moved into the second elevated position.

5. An active hood system as in claim 4 wherein the hinge comprises an actuator supporting member that holds the actuator and a base that supports the actuator.

6. An active hood system comprising:
an actuator attachable to a vehicle, the actuator being capable of moving the vehicle hood from a first position to a second, elevated position;
a dampener constructed to dampen the movement of the vehicle hood when said hood is actuated from the first position to the second position; and
a hinge that is connected to or positioned proximate the actuator, the hinge constructed to extend when the hood is moved into the second elevated position, wherein, the hinge comprises an actuator supporting member that holds the actuator and a base that supports the actuator, and wherein the supporting member includes at least one slot that extends into a central aperture.

7. An active hood system as in claim 4 wherein the actuator comprises at least one telescoping stage.

8. An active hood system as in claim 4 wherein the hinge includes at least one linkage.

9. An active hood system as in claim 8 further comprising a holding member that holds the linkages in a contracted position.

10. An active hood system as in claim 9 wherein the system is constructed such that deployment of the actuator moves the linkages from the contracted position into an extended position.

11. An active hood system as in claim 9 wherein the hinge comprises a locking member.

12. An active hood system as in claim 11 wherein the hinge comprises a rotation pin.

13. An active hood system as in claim 9 wherein the actuator is attached to the hinge via an actuator mounting member.

14. An active hood system as in claim 8 wherein the linkages comprise at least one tab.

15. An active hood system as in claim 4 wherein the actuator comprises a cylindrical groove having at least one mating flat.

16. An active hood system as in claim 4 wherein the hinge comprises at least one tab.

17. An active hood system comprising:
an actuator attachable to a vehicle, the actuator being capable of moving the vehicle hood from a first position to a second, elevated position; and
a dampener constructed to dampen the movement of the vehicle hood when said hood is actuated from the first position to the second position, wherein the dampener comprises a deformable tube; a cable that is attachable to the vehicle hood; and a deforming ball within the deformable tube, the deforming ball being attached to the cable.

18. An active hood system as in claim 17 wherein the deforming ball is positioned such that if the vehicle hood is moved into the elevated position, the deforming ball deforms the deformable tube.

19. An active hood system comprising:
an actuator attachable to a vehicle, the actuator being capable of raising the vehicle hood into a second elevated position by moving the hood through a first travel distance and a second travel distance, wherein, the actuator comprises at least one telescoping stage; and
a dampener constructed to dampen the movement of the vehicle hood during the travel of the hood through the second travel distance, wherein, the dampener comprises a deformable material housed within a retention bracket, a retention flange positioned within the retention bracket, and, a cable connected to the retention flange, the cable being attachable to the vehicle hood.

20. An active hood system as in claim 19 wherein the deformable material is positioned such that if the vehicle hood is moved through the second travel distance, the dampening material is crushed between the retention flange and the retention bracket.

21. An active hood system as in claim 19 further comprising a hinge that is connected to or positioned proximate the actuator, the hinge constructed to extend when the hood is moved into the second elevated position.

22. An active hood system as in claim 21 wherein the hinge includes at least one linkage.

23. An active hood system as in claim 22 wherein the linkage comprises at least one tab.

24. An active hood system as in claim 22 wherein the hinge further comprises a holding member that holds the linkages in a contracted position.

25. An active hood system as in claim 24 wherein the system is constructed such that deployment of the actuator moves the linkages from the contracted position into an extended position.

26. An active hood system as in claim 24 wherein the hinge further comprises a locking member.

27. An active hood system as in claim 26 wherein the locking member is a shear pin.

28. An active hood system as in claim 26 wherein the locking member is re-installable.

29. An active hood system as in claim 24 wherein the actuator is attached to the hinge via an actuator supporting member that is added to the hinge.

30. An active hood system as in claim 21 wherein the hinge further comprises a rotation pin.

31. An active hood system as in claim 21 wherein the hinge comprises an actuator supporting member that holds that actuator and a base that supports the actuator.

32. An active hood system as in claim 31 wherein the supporting member includes at least one slot that extends into a central aperture.

* * * * *

UNITED STATES PATENT AND TRADEMARK OFFICE
CERTIFICATE OF CORRECTION

PATENT NO. : 7,303,040 B2  Page 1 of 1
APPLICATION NO. : 10/847766
DATED : December 4, 2007
INVENTOR(S) : David J. Green et al.

It is certified that error appears in the above-identified patent and that said Letters Patent is hereby corrected as shown below:

On the title page item (73), delete "Autolive" and replace with --Autoliv--.

Signed and Sealed this

Thirtieth Day of December, 2008

JON W. DUDAS
*Director of the United States Patent and Trademark Office*